(12) United States Patent
Zhang et al.

(10) Patent No.: US 10,521,482 B2
(45) Date of Patent: Dec. 31, 2019

(54) FINDING MEMBERS WITH SIMILAR DATA ATTRIBUTES OF A USER FOR RECOMMENDING NEW SOCIAL CONNECTIONS

(71) Applicant: Microsoft Technology Licensing, LLC, Redmond, WA (US)

(72) Inventors: Liang Zhang, Fremont, CA (US); Lin Zhu, Beijing (CN); Di Wang, Beijing (CN); Sheng Zhao, Beijing (CN); Yang Liu, Beijing (CN); Shu Chen, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 267 days.

(21) Appl. No.: 15/543,361

(22) PCT Filed: Apr. 24, 2017

(86) PCT No.: PCT/CN2017/081619
§ 371 (c)(1),
(2) Date: Jul. 13, 2017

(87) PCT Pub. No.: WO2018/195691
PCT Pub. Date: Nov. 1, 2018

(65) Prior Publication Data
US 2019/0236106 A1    Aug. 1, 2019

(51) Int. Cl.
*G06F 17/30* (2006.01)
*G06F 16/9535* (2019.01)
(Continued)

(52) U.S. Cl.
CPC .... *G06F 16/9535* (2019.01); *G06F 16/90335* (2019.01); *G06F 16/9536* (2019.01); *G06N 20/00* (2019.01); *G06Q 50/01* (2013.01)

(58) Field of Classification Search
CPC ........... G06F 16/9635; G06F 16/90335; G06F 16/9036; G06F 16/9535; G06N 20/00
(Continued)

(56) References Cited

U.S. PATENT DOCUMENTS

| 8,667,009 B2 | 3/2014 | Voigt et al. |
| 9,275,420 B1 | 3/2016 | Fredinburg et al. |

(Continued)

FOREIGN PATENT DOCUMENTS

| CN | 102662975 A | 9/2012 |
| CN | 103714130 A | 4/2014 |

(Continued)

OTHER PUBLICATIONS

U.S. Appl. No. 15/125,782, filed Sep. 13, 2016, Quality Industry Content Mixed With Friend's Posts in Social Network.
(Continued)

*Primary Examiner* — Isaac M Woo
(74) *Attorney, Agent, or Firm* — Schwegman, Lundberg & Woessner, P.A.

(57) ABSTRACT

Methods, systems, and computer programs are presented for recommending new connections based on profile similarity and existing interconnections within a social network. One method includes an operation for detecting a request for new connections for a member of the social network, where the profile of the member includes values for certain attributes. Additionally, the method includes operations for identifying members that have at least one equal attribute to the attributes of the member, and for calculating a connection score for each identified member based on the respective values of the identified members attributes. Members are selected from the identified members based on the connection scores, and a ranking score for each selected member is obtained utilizing a machine learning algorithm that utilizes similarity (Continued)

analysis of the attributes to calculate the ranking score. The selected members are presented to the member as the possible new connections based on the ranking scores.

20 Claims, 13 Drawing Sheets

(51) Int. Cl.
*G06Q 50/00* (2012.01)
*G06F 16/903* (2019.01)
*G06N 20/00* (2019.01)
*G06F 16/9536* (2019.01)

(58) Field of Classification Search
USPC .................................................. 707/600–899
See application file for complete search history.

(56) References Cited

U.S. PATENT DOCUMENTS

| | | |
|---|---|---|
| 2002/0169782 A1 | 11/2002 | Lehmann et al. |
| 2010/0228777 A1 | 9/2010 | Imig et al. |
| 2012/0151383 A1 | 6/2012 | Kazan et al. |
| 2013/0031034 A1 | 1/2013 | Gubin et al. |
| 2014/0337257 A1 | 11/2014 | Chatterjee et al. |
| 2014/0337436 A1 | 11/2014 | Hoagland et al. |
| 2015/0006414 A1 | 1/2015 | Janapareddy et al. |
| 2015/0142584 A1 | 5/2015 | Liu et al. |
| 2015/0149453 A1 | 5/2015 | Blue et al. |
| 2015/0242497 A1 | 8/2015 | He et al. |
| 2016/0055235 A1 | 2/2016 | Zhang et al. |
| 2017/0085509 A1 | 3/2017 | Fernandez et al. |
| 2017/0193021 A1 | 7/2017 | Deng et al. |
| 2017/0255906 A1 | 9/2017 | Le et al. |
| 2017/0300862 A1 | 10/2017 | Bhadouria et al. |
| 2018/0089318 A1* | 3/2018 | Chatterjee ............... H04L 67/10 |
| 2018/0189288 A1 | 7/2018 | Zhang et al. |
| 2018/0189603 A1 | 7/2018 | Zhang et al. |

FOREIGN PATENT DOCUMENTS

| | | |
|---|---|---|
| CN | 103793503 A | 5/2014 |
| CN | 103984775 A | 8/2014 |
| CN | 104573046 A | 4/2015 |
| CN | 106571997 A | 4/2017 |
| CN | 107896510 | 4/2018 |
| CN | 108604230 A | 9/2018 |
| WO | 2018010147 | 1/2018 |
| WO | WO-2018023329 A1 | 2/2018 |
| WO | 2018195691 A1 | 11/2018 |

OTHER PUBLICATIONS

U.S. Appl. No. 15/125,801, filed Sep. 13, 2016, User Feed With Professional and Nonprofessional Content.
"International Application Serial No. PCT/CN2017/081619, International Search Report dated Jan. 23, 2018", 4 pgs.
"International Application Serial No. PCT/CN2017/081619, Written Opinion dated Jan. 23, 2018", 4 pgs.
"U.S. Appl. No. 15/125,782, Preliminary Amendment filed Sep. 13, 2016", 3 pgs.
"U.S. Appl. No. 15/125,801, Preliminary Amendment filed Sep. 13, 2016", 3 pgs.
"International Application Serial No. PCT/CN2016/090063, International Search Report dated Apr. 20, 2017", 4 pgs.
"International Application Serial No. PCT/CN2016/090063, Written Opinion dated Apr. 20, 2017", 4 pgs.
"International Application Serial No. PCT/CN2016/092667, International Search Report dated May 2, 2017", 4 pgs.
"International Applicational Serial No. PCT/CN2016/092667, Written Opinion dated May 2, 2017", 4 pgs.
"Applicant Initiated Interview Summary Issued in U.S. Appl. No. 15/125,782", dated May 22, 2019, 3 Pages.
"Final Office Action Issued in U.S. Appl. No. 15/125,782", dated Jun. 24, 2019, 37 Pages.
"Non Final Office Action Issued in U.S. Appl. No. 15/125,782", dated Jan. 25, 2019, 28 Pages.
"Final Office Action Issued in U.S. Appl. No. 15/125,801", dated Sep. 17, 2019, 34 Pages.
"Non Final Office Action Issued in U.S. Appl. No. 15/125,801", dated Apr. 29, 2019, 32 Pages.

* cited by examiner

FINDING MEMBERS WITH SIMILAR DATA ATTRIBUTES OF A USER FOR RECOMMENDING NEW SOCIAL CONNECTIONS

RELATED APPLICATIONS

This application is a U.S. National Stage Filing under 35 U.S.C. 371 of International Patent application Ser. No. PCT/CN2017/081619, filed Apr. 24, 2017, the benefit of priority of which is claimed hereby and which is incorporated by reference herein in its entirety.

TECHNICAL FIELD

The subject matter disclosed herein generally relates to methods, systems, and programs for making recommendations in a social network and, more particularly, methods, systems, and computer programs for recommending new connections to a member of the social network.

BACKGROUND

When a user first joins a social network, the user may have few, or no, social connections in the social network, and if the social network only presents friend's posts on the user feed, the feed may be almost empty. An empty feed means boredom and lack of interest by the user, and the user may decide to quit the social network.

In order to increase the number of the user's connections, the social network may make recommendations on possible new connections for the user, such as people that the user may already know, but not yet connected to, in the social network.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
FIG. 1 is a user interface for recommending new social connections to a user of a social network, according to some example embodiments.

Example methods, systems, and computer programs are directed to recommending new connections based on profile data similarity and existing interconnections within the social network. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Some social networks provide suggestions to members for possible new connections, referred to herein as "People You May Know" (PYMK). In some cases, the suggestions include members, also referred to as users, connected to the connections of the member, also referred to as connections of connections, or connections$^2$. As used herein, a "friend" of a member in the social network is another member that is connected directly in the social network. Indirect connections, also referred to as friends of friends, are those members that are not directly connected to the member but are connected to the member's friends.

In some cases, the possible new connections are suggested based on people on the social network that have similar characteristics (e.g., profile information) to the member. In some solutions, PYMK is generated by first looking at possible connections of connections, and if there are not enough people, additional suggestions are created by performing a search based on member profile and activity data.

Embodiments presented herein provide a better search for PYMK by blending searches for connections of connections and for similar members. Instead of using one or the other, the blended search, performed by a machine learning algorithm, selects the best possible candidates taking into account social network activity and profile data. In some embodiments, PYMK is divided in two phases. In the first phase, a search is performed for people that are connections of connections or that have the same values for certain attributes in the profile data of the member. The result is a pool of candidates being considered for the second phase. In the second phase, a machine learning algorithm provides a ranking score for the candidate members of the first phase in order to rank these candidates. In the second phase, similarity analysis is performed by the machine learning algorithm in order to better rank the candidates. The similarity analysis enables better identification of suggestions by taking into account similar values in the profile data, such as members that have similar titles (e.g., software developer versus application developer).

One general aspect includes a method including an operation for detecting, by one or more processors, a request associated with a first member of a social network. The request is for possible new connections for the first member, where a profile of the first member includes values for a plurality of attributes. The method also includes operations for identifying, by the one or more processors, members of the social network that have at least one equal attribute from the plurality of attributes of the first member, and for calculating, by the one or more processors, a connection score for each identified member based on the respective values of the attributes of the identified members. The method also includes selecting, by the one or more processors, members from the identified members based on the connection scores, and obtaining, utilizing a machine learning algorithm, a ranking score for each selected member. The machine learning algorithm utilizes similarity analysis for the attributes of the members to calculate the ranking score. The method further includes causing presentation, by the one or more processors, of one or more of the selected members as the possible new connections for the first member based on the ranking scores of the selected members.

One general aspect includes a system including a memory including instructions and one or more computer processors. The instructions, when executed by the one or more computer processors, cause the one or more computer processors to perform operations including: detecting a request associated with a first member of a social network, the request being for possible new connections for the first member, with a profile of the first member including values for a plurality of attributes; identifying members of the social network that have at least one equal attribute from the plurality of attributes of the first member; calculating a connection score for each identified member based on the respective values of the attributes of the identified members; selecting members from the identified members based on the connection scores; obtaining, utilizing a machine learning algorithm, a ranking score for each selected member, the machine learning algorithm utilizing similarity analysis for the attributes of the members to calculate the ranking score; and causing presentation of one or more of the selected members as the possible new connections for the first member based on the ranking scores of the selected members.

One general aspect includes a non-transitory machine-readable storage medium including instructions that, when executed by a machine, cause the machine to perform operations including: detecting a request associated with a first member of a social network, the request being for possible new connections for the first member, with a profile of the first member including values for a plurality of attributes; identifying members of the social network that have at least one equal attribute from the plurality of attributes of the first member; calculating a connection score for each identified member based on the respective values of the attributes of the identified members; selecting members from the identified members based on the connection scores; obtaining, utilizing a machine learning algorithm, a ranking score for each selected member, the machine learning algorithm utilizing similarity analysis for the attributes of the members to calculate the ranking score; and causing presentation of one or more of the selected members as possible new connections for the first member based on the ranking scores of the selected members.

FIG. 1 is a PYMK user interface 102 for recommending new social connections to a user of a social network, according to some example embodiments. The PYMK user interface 102 includes PYMK suggestions for a particular member of the social network. It is noted that the PYMK search for possible new connections may be initiated by the user by selecting an option in the social network, or the PYMK search may be initiated by the system and presented in some part of the social network user interface as an option with some initial suggestions.

The PYMK user interface 102 presents a plurality of member suggestions 104 and scrolling options for seeing additional suggestions. In some example embodiments, each member suggestion 104 includes the profile image of the member, the member's name, the member's title, the number of mutual connections, an option to dismiss 106 the member suggestion, and an option to request connecting 108 to the member suggestion. Mutual connections between two members of the social network are people in the social network that are directly connected to both members.

When the member selects the dismiss option 106, the dismissal is recorded by the social network so that member is not suggested again. When the user selects the connect option 108, the social network sends an invitation to the selected member for becoming a connection. Once the selected member accepts the invitation, then both members become connections in the social network.

It is noted that the embodiments illustrated in FIG. 1 are examples and do not describe every possible embodiment. Other embodiments may show a different number of suggestions, include additional data for each suggestion or less data, present the suggestions in a different layout within the user interface, and so forth. The embodiments illustrated in FIG. 1 should therefore not be interpreted to be exclusive or limiting, but rather illustrative.

Figure 2:
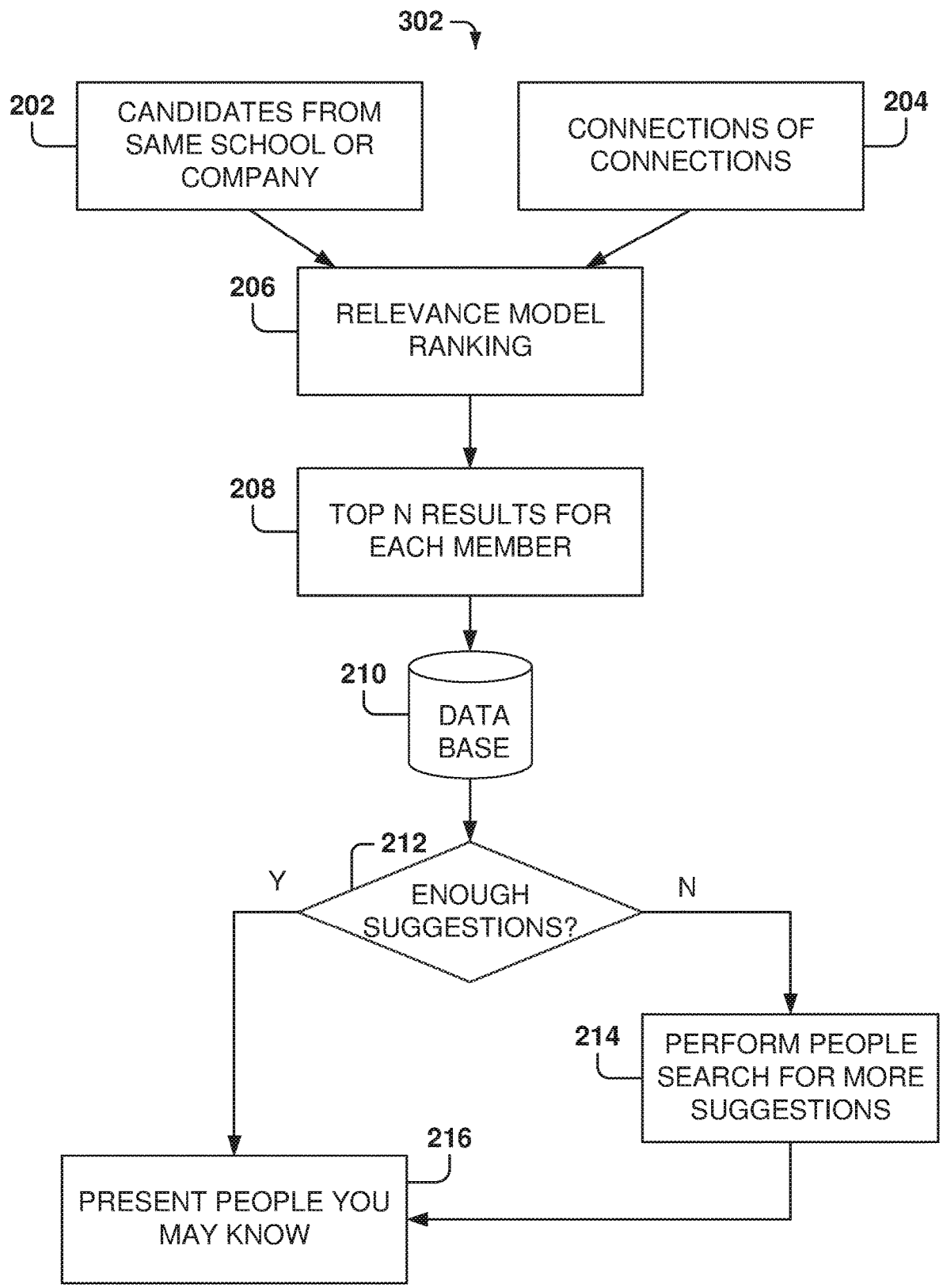
FIG. 2 is a flowchart of a method for identifying possible new connections, according to some example embodiments.

FIG. 2 is a flowchart of a method for identifying possible new connections, according to some example embodiments. In some example embodiments, the system identifies connections of connections and people with similar profiles to generate PYMK.

First, the connections of connections are identified as possible suggestions. If there are not enough suggestions, the system expands the search of PYMK candidates by making a search for people with similar profiles. Finding connections of connections is usually a good approach, but for new members of a social network, this may not work well because new members may have zero or few connections. Therefore, the new members may have few PYMK suggestions.

In addition, the system may look for suggestions by identifying people that attended the same educational institution as the member or that were coworkers at some point in time.

At operation 202, candidates from the same school or the same company as the member are searched. As used herein, the school refers to any educational institution that the member attended, such as high school, university, technical school, professional school, academy, and the like. In some example embodiments, people that graduated on the same year as the member are given a higher ranking score for selecting the best PYMK candidates.

Further, at operation 204, the connections of connections are identified by traversing the connection social tree of the social network. The connection social tree is a representation of the connections within the social network where members are the nodes and connections are established between the nodes for those existing connections in the social network.

At operation 206, a machine learning algorithm is utilized to score the candidates identified in operations 202 and 204. In some example embodiments, the machine learning algorithm is a relevance model ranking algorithm (e.g., a logistic regression model), but other machine learning algorithms may be utilized. More details on the machine learning algorithm are provided below with reference to FIG. 8.

In some example embodiments, the machine learning algorithm is trained utilizing member activity in the social network and member profile data. For example, the machine learning algorithm analyzes the history of PYMK shown to members in the social network and how those suggestions become connection requests by the members of the social network. The machine learning algorithm may also be trained by analyzing existing connections and similarities between connections.

Other features utilized by the machine learning algorithm may include how many common friends the member has with a PYMK candidate member, whether the candidate and the member attended the same school, whether the candidate and the member worked for the same company, the number of professional connections, and so forth.

From operation 206, the method flows to operation 208 where a top number (e.g., n) of results are identified for each member as possible PYMK candidates. In some example embodiments, the top n members selected are stored in a database 210 or some other type of memory.

In some example embodiments, the candidates of operation 208 are pregenerated off-line by the system (e.g., the list of candidates is created even before a PYMK search is detected). For example, the list of candidates may be pregenerated once a day (or with some other frequency) for at least some of the members of the social network (e.g., for the members within a country or a region).

At operation 212, a check is made to determine if there are enough candidate members that may be used as suggestions for PYMK. For example, a check is made to determine if the list of candidates includes at least a predetermined threshold number of people. If there are enough candidates (e.g., the number of results exceeds the threshold), the method flows to operation 216, but if there are not enough candidates above the threshold number, the method flows to operation 214.

At operation 214, a search is made for people in the social network that are similar to the member. The search may include a few data fields from the profile of the member or a large number of fields from the profile of the member. For example, in some embodiments a limited number of fields are used, such as title, company, and school. In other embodiments, additional or different fields may be used for the PYMK search. At operation 216, the identified members are presented, sorted based on the score assigned to each of the candidates.

Figure 3:
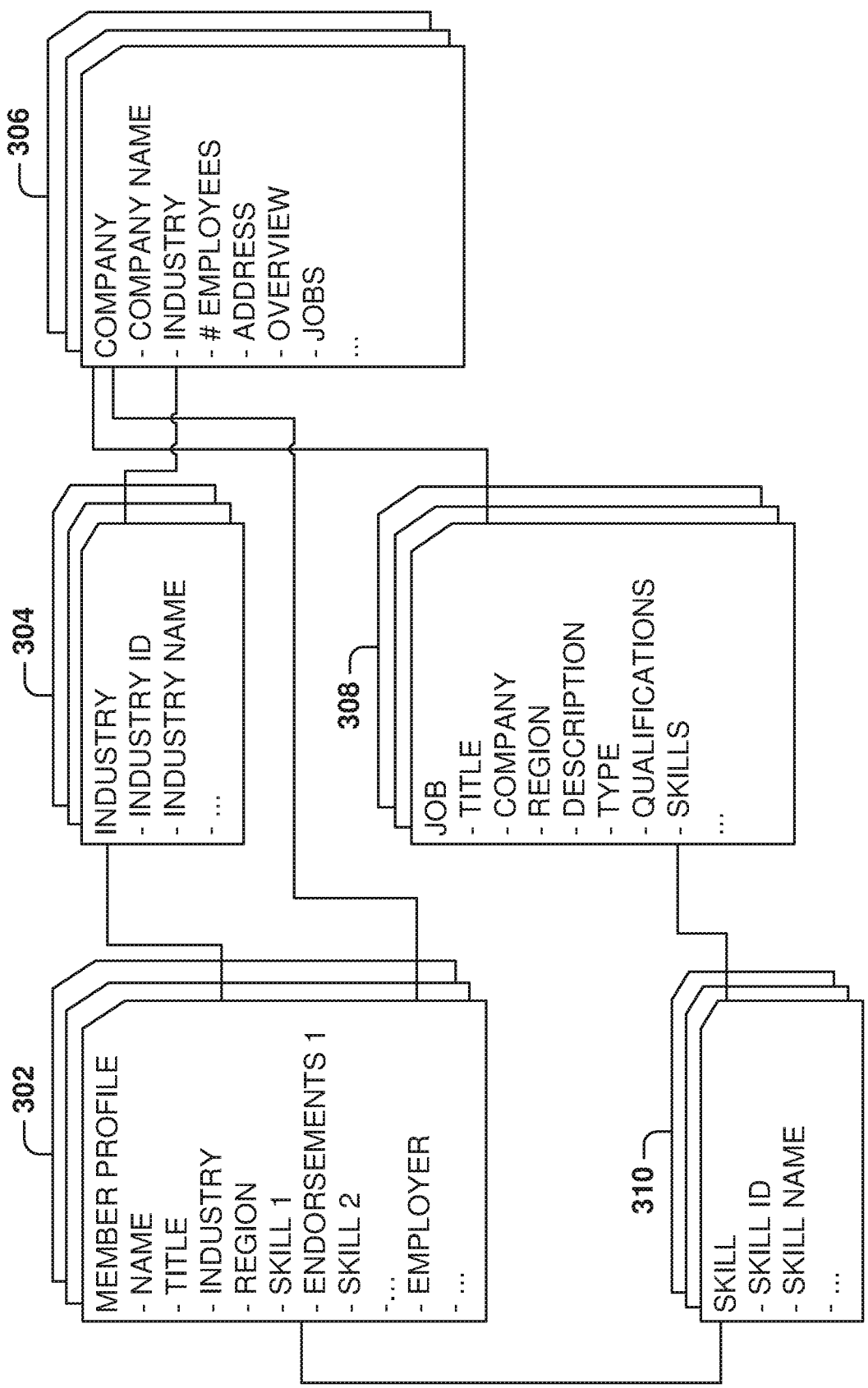
FIG. 3 illustrates data structures for storing job and member information, according to some example embodiments.

FIG. 3 illustrates data structures for storing job and member information, according to some example embodiments. Each user in the social network has a member profile 302, which includes information about the user. The user profile is configurable by the user and also includes information based on the user activity in the social network (e.g., likes, posts read).

In one example embodiment, the member profile 302 may include information in several categories, such as experience, education, skills and endorsements, accomplishment, contact information, following, and the like. Skills include professional competences that the member has, and the skills may be added by the member or by other members of the social network. Example skills include C++, Java, Object Programming, Data Mining, Machine Learning, Data Scientist, and the like. Other members of the social network may endorse one or more of the skills and, in some example embodiments, the account is associated with the number of endorsements received for each skill from other members.

The member profile 302 includes member information, such as name, title (e.g., job title), industry (e.g., legal services), geographic region, employer, skills and endorsements, and so forth. In some example embodiments, the member profile also includes job related data, such as jobs previously applied to, or jobs already suggested to the member (and how many times the job has been suggested to the member). Within member profile 302, the skill information is linked to skill data 310, the employer information is linked to company data 306, and the industry information is linked to industry data 304.

The experience information includes information related to the professional experience of the user. In one example embodiment, the experience information includes an industry 304, which identifies the industry in which the user works. In one example embodiment, the user is given an option to select an industry from a plurality of industries when entering this value in the profile. In other example embodiments, the user may also enter an industry that is not in the list of predefined industries. In some example embodiments, the industry is defined at a high level. Some examples of industries configurable in the user profile include information technology, mechanical engineering, marketing, and the like. The experience information area may also include information about the current job and previous jobs held by the user.

The skills 310 and endorsements includes information about professional skills that the user has identified as having been acquired by the user, and endorsements entered by other users of the social network supporting the skills of the user. Accomplishments include accomplishments entered by the user, and contact information includes contact information for the user, such as email and phone number.

The industry data 304 is a table for storing the industries identified in the social network. In one example embodiment, the industry data 404 includes an industry identifier (e.g., a numerical value or a text string), and an industry name, which is a text string associated with the industry (e.g., legal services).

In one example embodiment, the company data 306 includes company information, such as company name, industry associated with the company, number of employees, address, overview description of the company, job postings, and the like. In some example embodiments, the industry is linked to the industry data 304.

The skill data 310 is a table for storing the different skills identified in the social network. In one example embodiment, the skill data 310 includes a skill identifier (ID) (e.g., a numerical value or a text string) and a name for the skill. The skill identifier may be linked to the member profiles 302 and job data 308.

In one example embodiment, job data 308 includes data for jobs posted by companies in the social network. The job data 308 includes one or more of a title associated with the job (e.g., software developer), a company that posted the job, a geographic region for the job, a description of the job, a type of job, qualifications required for the job, and one or more skills. The job data 308 may be linked to the company data 306 and the skill data 310.

It is noted that the embodiments illustrated in FIG. 3 are examples and do not describe every possible embodiment. Other embodiments may utilize different data structures, fewer data structures, combine the information from two data structures into one, add additional or fewer links among the data structures, and the like. The embodiments illustrated in FIG. 3 should therefore not be interpreted to be exclusive or limiting, but rather illustrative.

Figure 4:
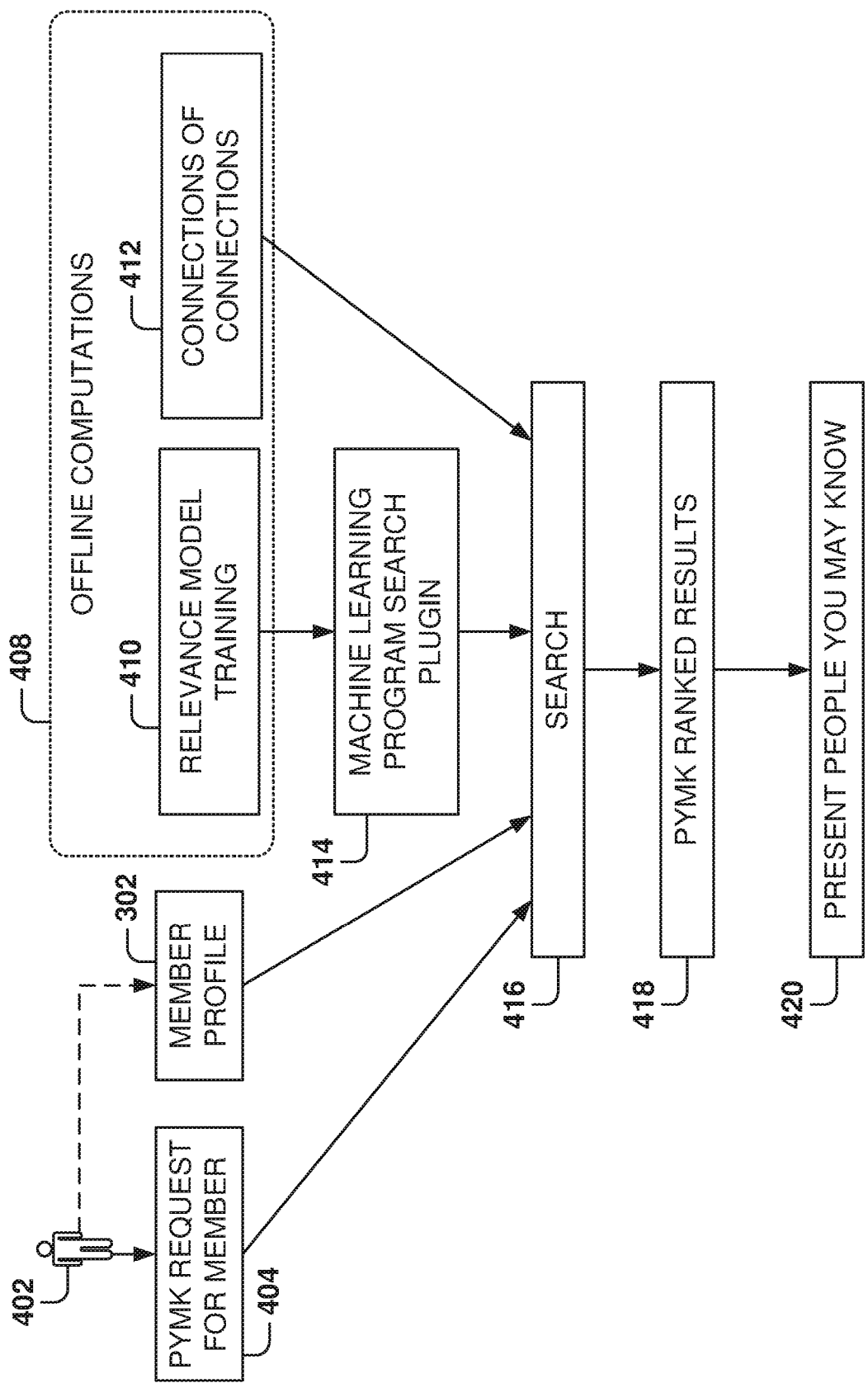
FIG. 4 illustrates the architecture for identifying possible new connections utilizing offline computations, according to some example embodiments.

FIG. 4 illustrates the architecture for identifying possible new connections utilizing offline computations, according to some example embodiments. FIG. 4 illustrates an algorithm that "blends" the search for connections of connections and for similar members in a way that takes into account the value of different search features for finding the best PYMK candidates.

To determine PYMK suggestions for member 402, with profile 302, a PYMK request 404 is initiated by the social network. A couple of offline computations 408 are performed by the social network even before the PYMK request is detected. The offline computations 408 include relevance model training 410 and calculating connections of connections 412.

The relevance model training 410 includes the training of the machine learning algorithm for assessing features when finding PYMK candidates. The result of the relevance model training 410 is a trained machine learning program 414, such as a plug-in that is utilized by the search engine for PYMK suggestions.

Calculating the connections of connections 412 includes traversing the social network graph to identify the connections of connections for each of the members, or at least for a plurality of the members of the social network (e.g., members within a geographical location such as a country).

At operation 416, a search is made for PYMK candidates, where the search takes into consideration the member, the member profile 302, the machine learning plugin 414, and the connections of connections 412. In some example embodiments, the search is an Elasticsearch, but other search algorithms may be utilized. Elasticsearch is a search engine that provides a distributed, multitenant-capable full-text search engine with an hypertext transfer protocol (HTTP) web interface and schema-free JSON documents.

The search in operation 416 generates a list of PYMK candidates 418, where each candidate includes a ranking score, and the list of PYMK candidates are sorted by the ranking score. The PYMK candidates include connections of connections as well as members with profiles similar to the member being offered PYMK suggestions. In some example embodiments, the search in operation 416 is done using a relevance model that ranks the results from the Elasticsearch. More details are provided below with reference to FIG. 5. A predetermined number of PYMK candidates from the top of the list are selected for presentation to the user at operation 420.

Instead of doing separate searches for connections of connections and similar members, a blended search is performed taking into account profile data as well as connectivity data. This improves the quality of the PYMK suggestions generated by the social network.

Figure 5:
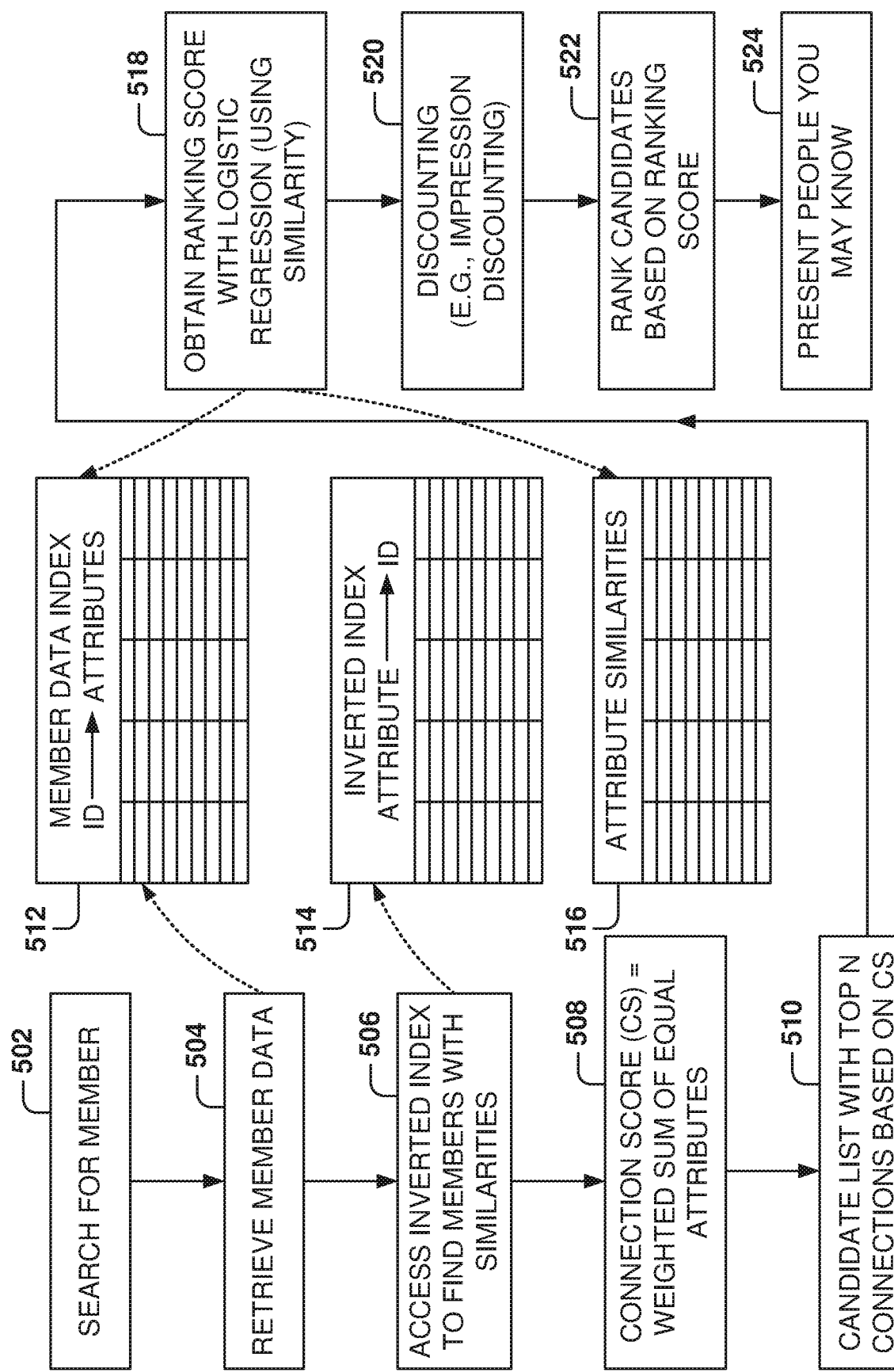
FIG. 5 illustrates a method for generating possible new connections by blending the search for similar members with friends of friends, according to some example embodiments.

FIG. 5 illustrates a method for generating possible new connections by blending the search for similar members with connections of connections, according to some example embodiments. FIG. 5 provides more detail to the search described above with reference to FIG. 4.

The PYMK search has two phases: a retrieval phase followed by a ranking phase. In the retrieval phase, a large number of candidates are identified and in the ranking phase, the candidates are evaluated to determine a list of candidates sorted by their potential value as PYMK suggestions. In other words, the retrieval phase assures that good candidates are not lost in the search, and the ranking phase fine tunes the value of the candidates for presentation. It is noted that the retrieval search utilizes one or more inverted indexes and the ranking phase utilizes a forward index.

At operation 502, a PYMK search is initiated for a member. From operation 502, the method flows to operation 504 to retrieve member data. The member data is accessed from the member data index 512 that includes profile data. In one example embodiment, the member data index 512 is indexed by user ID, and the member data index 512 includes attributes associated with the user ID. The attributes may be any of the attributes found in the profile of the member, as discussed above, such as title, school, company, and so forth.

From operation 504, the method flows to operation 506, where one or more inverted indices are accessed to find members of the social network with similarities to the member being searched for. The similarities may be for any of the fields identified in the profile of the member, and for simplicity of description, the similarities also may include being a connection of a connection.

In some example embodiments, the attributes utilized in the first phase are user title, user industry, work companies, school or schools, and common friends (e.g., connections of connections). Other embodiments may utilized different fields, additional fields, fewer fields, and so forth.

The social network builds the inverted indices offline to be able to perform PYMK searches that are quick and cheap (in the amount of computing resources utilized). An inverted index 514 is indexed by the corresponding attribute to access user IDs having that value. For example, if the member went to Stanford University, the inverted index of school to member ID is accessed to retrieve the members that attended Stanford University. Similarly, order inverted indices may be used for the title, the school, connections of connections, and the like. The inverted indices may be very large if the social network has a large number of members, so usually 2 to 4 attributes are used for this search and the corresponding 2 to 4 indices are created. However, other implementations may include additional fields and create additional indices.

At operation 508, a connection score CS is calculated for a plurality of members of the social network. In some example embodiments, the CS is calculated as a weighted sum for attributes that are equal between the member and the candidate. The $CS(m, C_i)$ is the connection score when searching for member m for a candidate $C_i$, and may be calculated with the following equations:

$$CS(m, C_i) = \sum_j w_j \cdot AC_j(m, C_i);$$

$$AC_j(m, C_i) = \begin{pmatrix} 1 & \text{if } A_j(m) = A_j(C_i) \\ 0 & \text{if } A_j(m) \neq A_j(C_i) \end{pmatrix}$$

Where $w_j$ is a weight assigned to an attribute Aj, and $AC_j(m, C_i)$ is a function, referred to as attribute comparison for attribute $A_j$ between members m and $C_i$, such that if member in and candidate $C_i$ have an equal value for attribute $A_j$, then $AC_j(m, C_i)$ is equal to 1, and if they have a different value, then $AC_j(m, C_i)$ is equal to 0.

Therefore, $CS(m, C_i)$ is a sum for all attributes in consideration of $AC_j(m, C_i)$. In other words, $CS(m, C_i)$ is a sum of all $w_j$s for all attributes where the member and the candidate have the same value (e.g., same title for m and $C_i$, or m and $C_i$ are connections of connections).

It is noted that in other embodiments, other types of calculations may be used to calculate the CS, such as by utilizing an average, or a count of ACs equal to 1, a multiplication of factors, and the like.

For example, if CS is calculated using title, education, and connections of connections, the equation could be expressed as follows:

$$CS(C_i)=w_1(m \text{ title}=C_i \text{ title})+w_2(m \text{ school}=C_i \text{ school})+ w_3(m \text{ and } C_i \text{ are connections}^2)$$

From operation 508, the method flows to operation 510 where a candidate list is generated with a predetermined number of candidates with the best CS score. For example, the system may select 1000 or 5000 members, although other embodiments may utilize a different number of candidates.

The ranking phase starts at operation 518, where the ranking score is calculated for each of the candidates selected in operation 510. In one example embodiment, the ranking score is calculated using a logistic regression model utilizing similarity calculations, represented by attribute similarities table 516. The attributes used for similarity calculations may be the same attributes utilized in the first phase or different attributes may be utilized for the ranking phase. The machine learning algorithm utilizes a plurality of features for obtaining the ranking score. For example, the higher the number of common connections the member has with the candidate, the higher the ranking score for the candidate.

The member data index 512 is a forward index that maps member ID to attribute values and is used to obtain the attribute values of the candidates in consideration. More details are provided below with reference to FIG. 6 for calculating the ranking score, and more details are provided below with reference to FIGS. 6, 9, and 10 for calculating and using similarities.

At operation 520, some of the candidates are discounted based on past user activity. For example, candidates that have been presented a few times to the member, but whom the member has never selected, are discarded from further consideration.

From operation 520, the method flows to operation 522 where the remaining candidates are ranked based on the ranking score. At operation 524, the best PYMK candidates are presented to the member.

This method blends searching for common friends with searching with members with similarities. It provides a smooth transition for new members, which have none or few connections, to more senior members that have a large number of connections. As the number of connections grow, the connections of connections factor may grow in relevance as the number of possible candidates for this category grows. It doesn't matter if the user is a new member or not, the social network will always find some suggestions for the member. However, the system will also continue to search for candidates in the social network that have similarities with the member.

Figure 6:
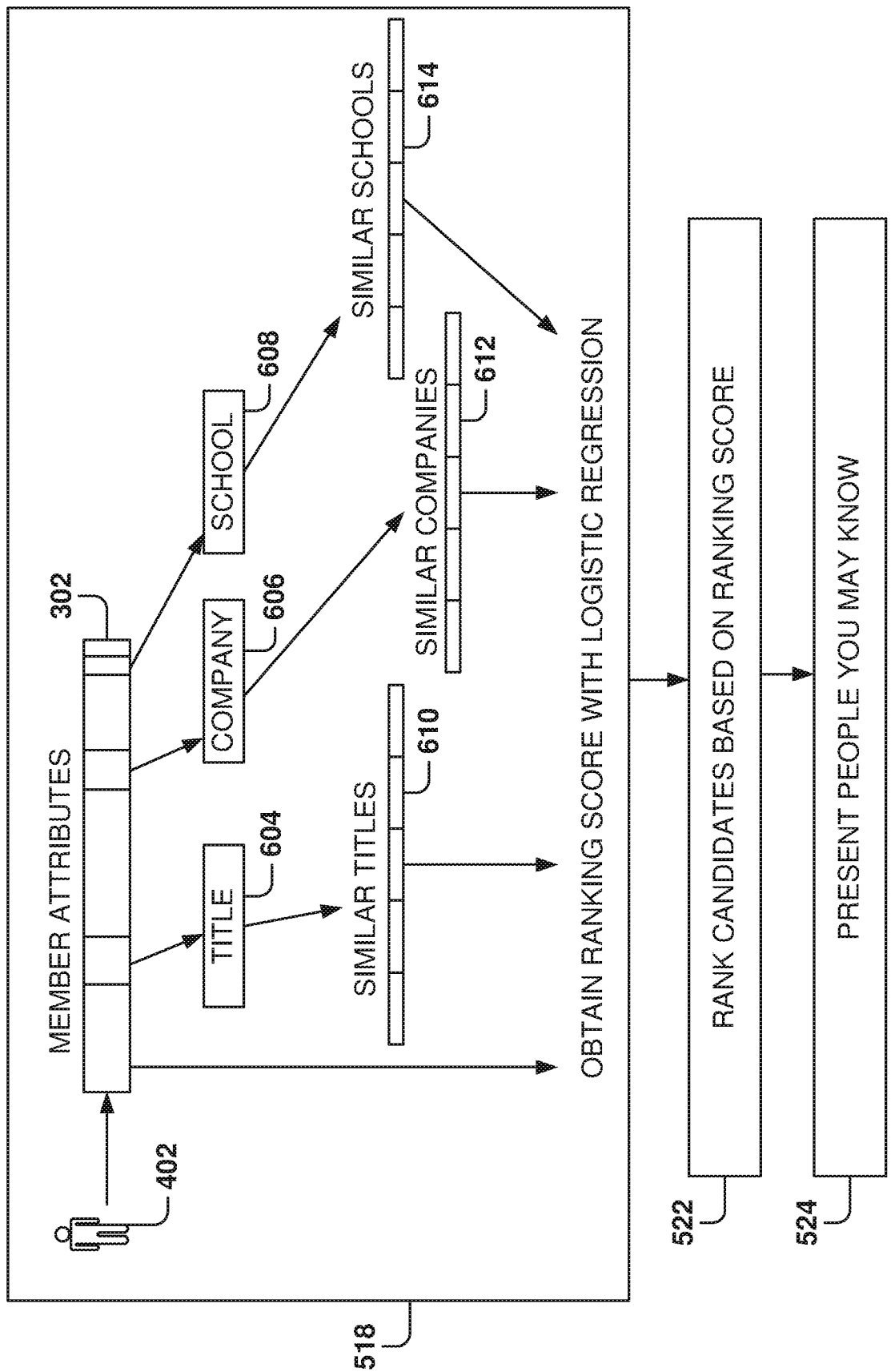
FIG. 6 illustrates the details for ranking possible new connections, according to some example embodiments.

FIG. 6 illustrates the details for ranking possible new connections, according to some example embodiments. When performing a PYMK search for member 402, the member attributes 302 are assessed for finding candidates. In the example illustrated in FIG. 6, similar titles 610 are determined for title 604, similar companies 612 are determined for company 606, and similar schools 614 are determined for the school or schools 608 of member 402. It is noted that the member may have worked for one or more companies and attended one or more schools, so all the company values and school values are entered for the search of similar companies or schools.

It is noted that each similar title may include a similarity value for weighing the similarity, such that some titles may be more similar than others, therefore more relevant. More details are provided below with reference to FIG. 9 for obtaining title similarities.

At operation 518, the machine learning program obtains the ranking score utilizing off-line logistic regression, taking into consideration the similar titles 610, the similar companies 612, the similar schools 614, and the attributes 302 of the member profile. In addition, the machine learning program may consider other data (not shown), such as member activities in the social network.

From operation 518, the method flows to operation 522 to rank the candidates based on the ranking score, and in operation 524, the PYMK candidates are presented to the member 402.

Figure 7:
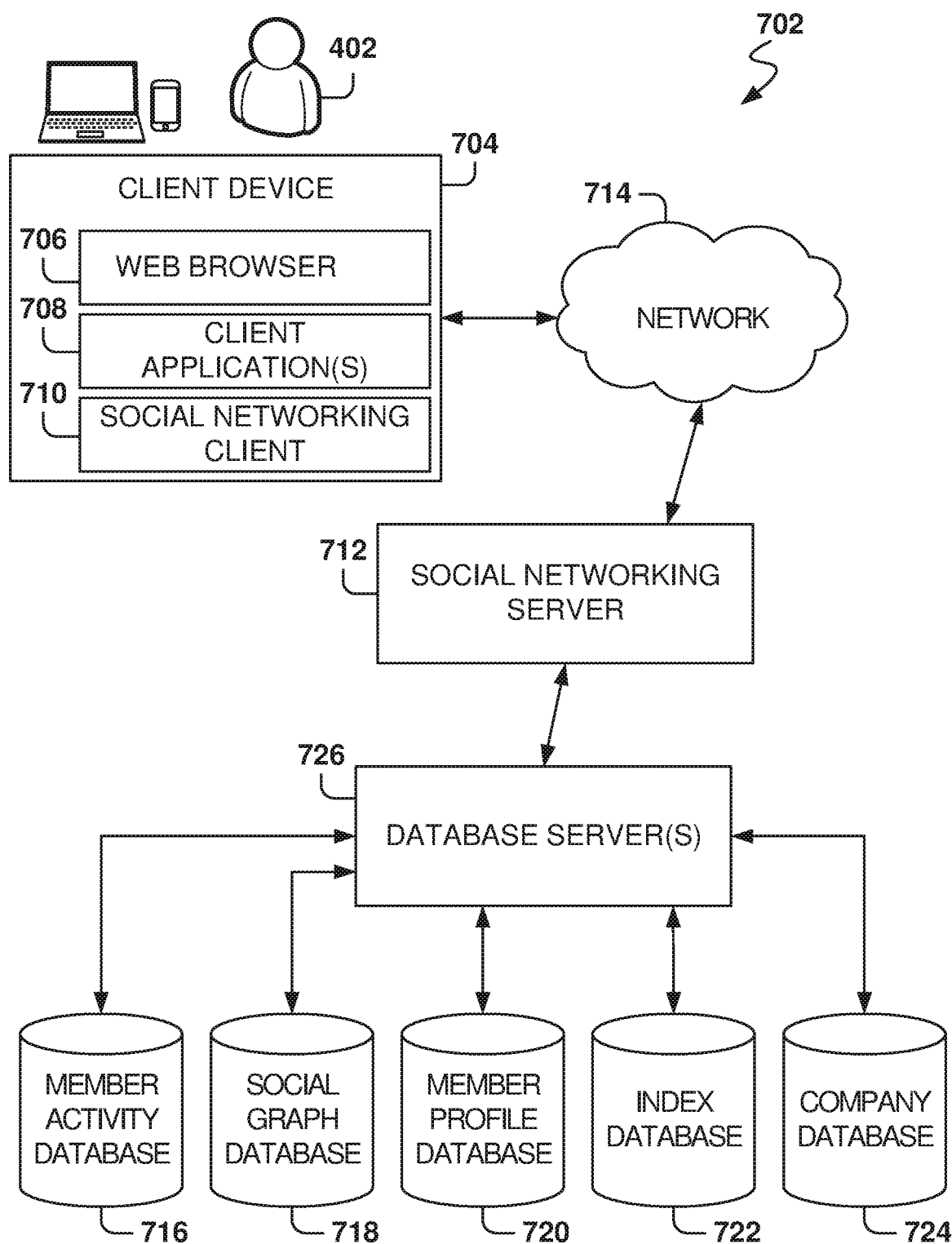
FIG. 7 is a block diagram illustrating a networked system, according to some example embodiments, including a social networking server.

FIG. 7 is a block diagram illustrating a networked system, according to some example embodiments, including a social networking server 712, illustrating an example embodiment of a high-level client-server-based network architecture 702. The social networking server 712 provides server-side functionality via a network 714 (e.g., the Internet or a wide area network (WAN)) to one or more client devices 704. FIG. 7 illustrates, for example, a web browser 706 (e.g., the Internet Explorer® browser developed by Microsoft® Corporation), client application(s) 708, and a social networking client 710 executing on a client device 704. The social networking server 712 is further communicatively coupled with one or more database servers 726 that provide access to one or more databases 716-724.

The client device 704 may comprise, but is not limited to, a mobile phone, a desktop computer, a laptop, a portable digital assistant (PDA), a smart phone, a tablet, an ultra book, a netbook, a multi-processor system, a microprocessor-based or programmable consumer electronic system, or any other communication device that a user 402 may utilize to access the social networking server 712. In some embodiments, the client device 704 may comprise a display module (not shown) to display information (e.g., in the form of user interfaces). In further embodiments, the client device 704 may comprise one or more of touch screens, accelerometers, gyroscopes, cameras, microphones, global positioning system (GPS) devices, and so forth.

In one embodiment, the social networking server 712 is a network-based appliance that responds to initialization requests or search queries from the client device 704. One or more users 402 may be a person, a machine, or other means of interacting with the client device 704. In various embodiments, the user 402 is not part of the network architecture 702, but may interact with the network architecture 702 via the client device 704 or another means. For example, one or more portions of the network 714 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 704 may include one or more applications (also referred to as "apps") such as, but not limited to, the web browser 706, the social networking client 710, and other client applications 708, such as a messaging application, an electronic mail (email) application, a news application, and the like. In some embodiments, if the social networking client 710 is present in the client device 704, then the social networking client 710 is configured to locally provide the user interface for the application and to communicate with the social networking server 712, on an as-needed basis, for data and/or processing capabilities not locally available (e.g., to access a member profile, to authenticate a user 402, to identify or locate other connected members, etc.). Conversely, if the social networking client 710 is not included in the client device 704, the client device 704 may use the web browser 706 to access the social networking server 712.

Further, while the client-server-based network architecture 702 is described with reference to a client-server architecture, the present subject matter is of course not limited to such an architecture, and could equally well find application in a distributed, or peer-to-peer, architecture system, for example.

In addition to the client device 704, the social networking server 712 communicates with the one or more database server(s) 726 and database(s) 716-724. In one example embodiment, the social networking server 712 is communicatively coupled to a member activity database 716, a social graph database 718, a member profile database 720, an index database 722, and a company database 724. The databases 716-124 may be implemented as one or more types of databases including, but not limited to, a hierarchical database, a relational database, an object-oriented database, one or more flat files, or combinations thereof.

The member profile database 720 stores member profile information about members who have registered with the social networking server 712. With regard to the member profile database 720, the member may include an individual person or an organization, such as a company, a corporation, a nonprofit organization, an educational institution, or other such organizations.

Consistent with some example embodiments, when a user initially registers to become a member of the social networking service provided by the social networking server 712, the user is prompted to provide some personal information, such as name, age (e.g., birth date), gender, interests, contact information, home town, address, spouse's and/or family members' names, educational background (e.g., schools, majors, matriculation and/or graduation dates, etc.), employment history, professional industry (also referred to herein simply as industry), skills, professional organizations, and so on. This information is stored, for example, in the member profile database 720. Similarly, when a representative of an organization initially registers the organization with the social networking service provided by the social networking server 712, the representative may be prompted to provide certain information about the organization, such as the company industry. This information may be stored, for example, in the member profile database 720. In some embodiments, the profile data may be processed (e.g., in the background or offline) to generate various derived profile data. For example, if a member has provided information about various job titles that the member has held with the same company or different companies, and for how long, this information may be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile.

In some example embodiment, the index database 722 is used to store one or more of the indices shown in FIG. 5. In some example embodiments, a company database 724 stores information regarding companies in the member's profile. A company may also be a member, but some companies may not be members of the social network although some of the employees of the company may be members of the social network. The company database 724 includes company information, such as name, industry, contact information, website, address, location, geographic scope, and the like.

As users interact with the social networking service provided by the social networking server 712, the social networking server 712 is configured to monitor these interactions. Examples of interactions include, but are not limited to, commenting on posts entered by other members, viewing member profiles, editing or viewing a member's own profile, sharing content outside of the social networking service (e.g., an article provided by an entity other than the social networking server 712), updating a current status, posting content for other members to view and comment on, job suggestions for the members, job-post searches, and other such interactions. In one embodiment, records of these interactions are stored in the member activity database 716, which associates interactions made by a member with his or her member profile stored in the member profile database 720. In one example embodiment, the member activity database 716 includes the posts created by the users of the social networking service for presentation on user feeds.

In one embodiment, the social networking server 712 communicates with the various databases 716-124 through the one or more database server(s) 726. In this regard, the database server(s) 726 provide one or more interfaces and/or services for providing content to, modifying content in, removing content from, or otherwise interacting with the databases 716-124. For example, and without limitation, such interfaces and/or services may include one or more Application Programming Interfaces (APIs), one or more services provided via a Service-Oriented Architecture (SOA), one or more services provided via a REST-Oriented Architecture (ROA), or combinations thereof. In an alternative embodiment, the social networking server 712 communicates with the databases 716-124 and includes a database client, engine, and/or module, for providing data to, modifying data stored within, and/or retrieving data from the one or more databases 716-124.

While the database server(s) 726 is illustrated as a single block, one of ordinary skill in the art will recognize that the database server(s) 726 may include one or more such servers. For example, the database server(s) 726 may include, but are not limited to, a Microsoft® Exchange Server, a Microsoft® Sharepoint® Server, a Lightweight Directory Access Protocol (LDAP) server, a MySQL database server, or any other server configured to provide access to one or more of the databases 716-124, or combinations thereof. Accordingly, and in one embodiment, the database server(s) 726 implemented by the social networking service are further configured to communicate with the social networking server 712.

Figure 8:
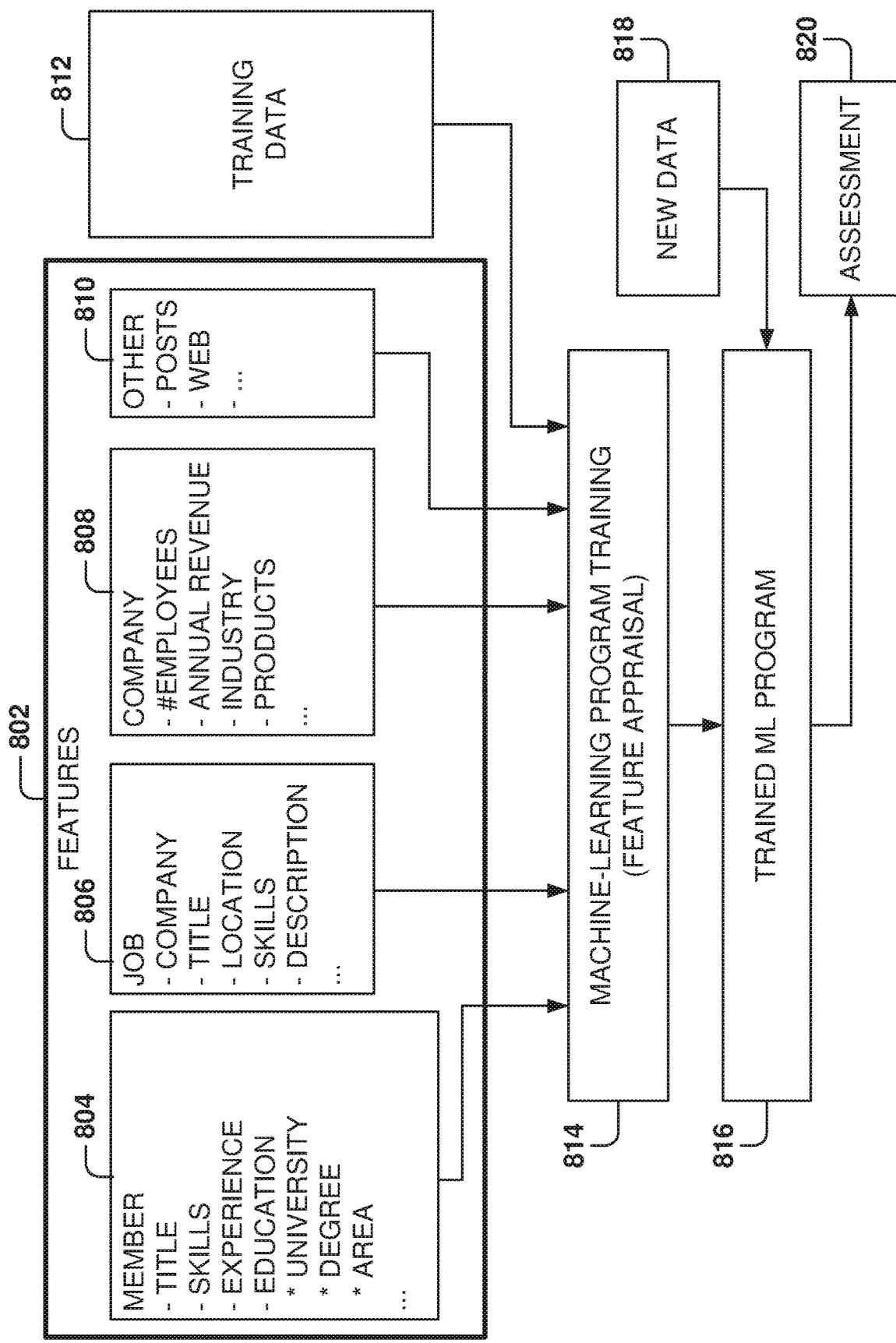
FIG. 8 illustrates the training and use of a machine-learning program, according to some example embodiments.

FIG. 8 illustrates the training and use of a machine-learning program 816, according to some example embodiments. In some example embodiments, machine-learning programs, also referred to as machine-learning algorithms or tools, are utilized to perform operations associated with job searches.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 812 in order to make data-driven predictions or decisions expressed as outputs or assessments 820. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

In general, there are two types of problems in machine learning: classification problems and regression problems. Classification problems aim at classifying items into one of several categories (for example, is this object an apple or an orange?). Regression algorithms aim at quantifying some items (for example, by providing a value that is a real number). In some embodiments, example machine-learning algorithms provide a ranking score (e.g., a number from 1 to 100) to qualify each candidate member as a good PYMK suggestion. The machine-learning algorithms utilize the training data 812 to find correlations among identified features 802 that affect the outcome.

In one example embodiment, the features 802 may be of different types and may include one or more of member features 804, job features 806, company features 808, and other features 810. The member features 804 may include one or more of the data in the member profile 302, as described in FIG. 3, such as title, skills, experience, education, and the like. The company features 808 may include any data related to the company. In some example embodiments, additional features in the other features 810 may be included, such as post data, message data, web data, and the like.

With the training data 812 and the identified features 802, the machine-learning tool is trained at operation 814. The machine-learning tool appraises the value of the features 802 as they correlate to the training data 812. The result of the training is the trained machine-learning program 816.

When the machine-learning program 816 is used to perform an assessment, new data 818 is provided as an input to the trained machine-learning program 816, and the machine-learning program 816 generates the assessment 820 as output. For example, when a PYMK search is performed, the assessment 820 includes the CS the scores for a plurality of members of the social network.

Figure 9:
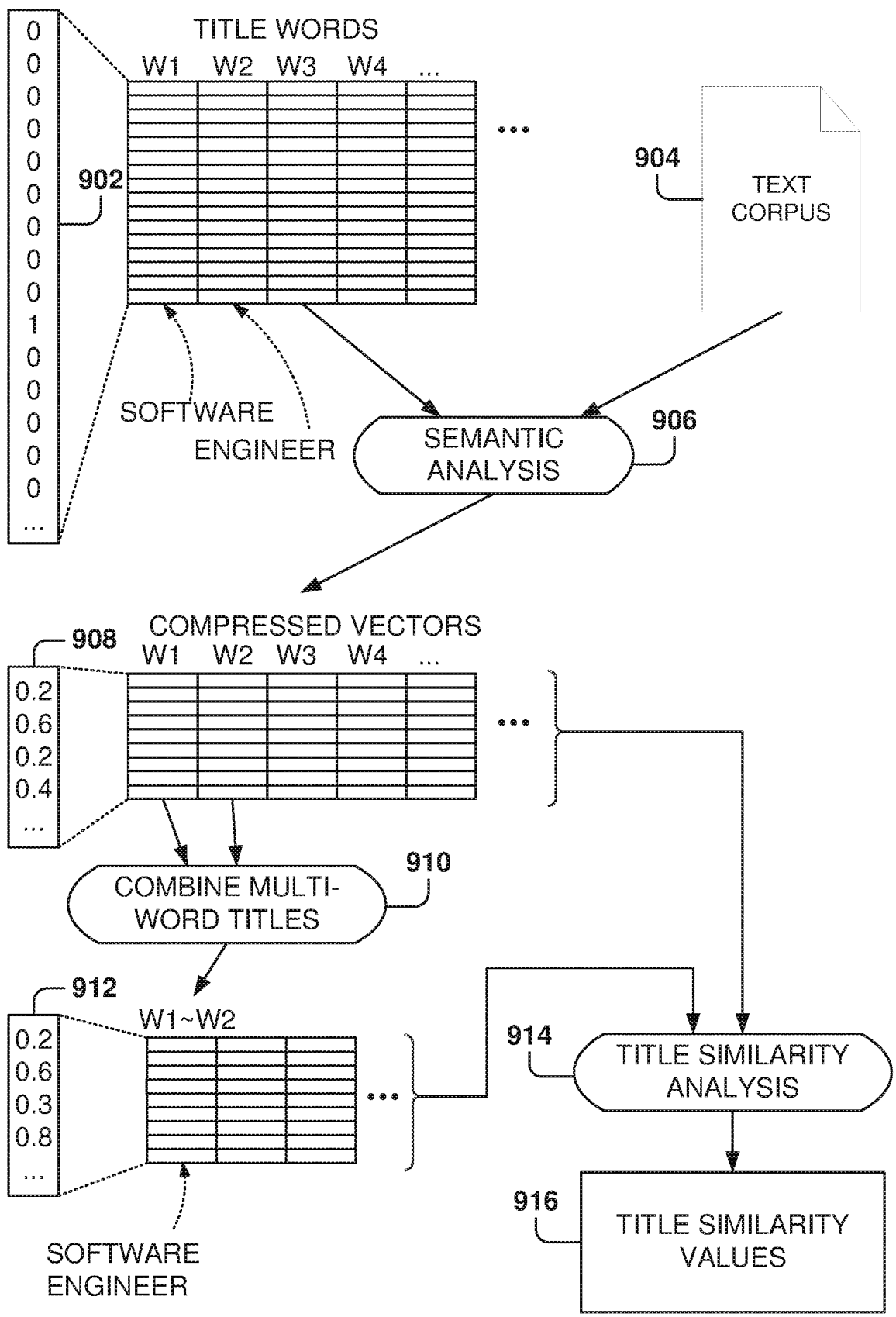
FIG. 9 illustrates a method for identifying similarities among titles based on semantic analysis, according to some example embodiments.

FIG. 9 is illustrates a method for identifying similarities among titles based on semantic analysis, according to some example embodiments. In one example embodiment, each word from the title is represented as a vector the size of the vocabulary with a 1 corresponding to the word and the rest of the elements in the vector equal to 0. This representation is referred to as a bag-of-words vector representation. For example, the word "software" has a vector 902 with a single 1 and the word "engineer" also has a single 1 in the vector, but in a different position.

In one example embodiment, the vectors are condensed into a fixed dimension vector (e.g., with a dimension of 200, but other sizes are also possible) and the elements of the condensed vector are real numbers, where more than one element may be nonzero. For example, for the word "software," there is a corresponding compressed vector 908 with a plurality of non-zero values.

The semantic analysis finds similarities among words by creating a vector 908 for each word such that words with similar meanings have vectors near each other. In one example embodiment, the tool Word2vec is used to perform the semantic analysis, but other tools may also be used, such as Gensim, Latent Dirichlet Allocation (LDA), or Tensor flow.

These models are shallow, two-layer neural networks that are trained to reconstruct linguistic contexts of words. Word2vec takes as input a large corpus of text and produces a high-dimensional space (typically between a hundred and several hundred dimensions). Each unique word in the corpus is assigned a corresponding vector 908 in the space. The vectors 908 are positioned in the vector space such that words that share common contexts in the corpus are located in close proximity to one another in the space. In one example embodiment, each element of the vector 908 is a real number.

For example, Word2vec may be utilized to identify the similarity between two words. In one example, a large number of titles were used as input, and a list was created of words having a similar meaning to the word "software." A text corpus 904 is used by the semantic analysis tool to identify similarities. In some example embodiments, the text corpus 904 includes member related data and company data, but other embodiments may utilize fewer data or additional data, such as user posts on the social network, industry data, skill data, and the like.

In another example embodiments, a semantic analysis 906 is performed utilizing job application data by pairing member title to job title for each job application.

In some example embodiments, the following parameters were used for performing the semantic analysis 906:

Minimum number of occurrences of a word to be considered in the vocabulary min_count (e.g., 5).

Maximum size of left window and right window from the target word window_size (e.g., 5).

Number of negative samples to be used negative_sample (e.g., 25).

Number of concurrent steps concurrent_steps (e.g., 12).

Subsample threshold for word occurrence subsample, where words that appear with higher frequency will be randomly down-sampled (e.g., $1e^{-3}$)

Number of epochs num_epochs (e.g., 15).

In some example embodiments, tokenization and stemming are performed on the titles (as well as industries, skills, etc.). Tokenization is the process of demarcating and possibly classifying sections of a string of input characters. Further, documents may include different forms of a word, such as "organize," "organizes," and "organizing." Additionally, there are families of derivationally related words with similar meanings, such as "democracy," "democratic," and "democratization." In one example embodiment, common stop words are removed. Stop words are the most common words in English, and the number of stop words may vary from a few dozens to several hundreds. Any group of words may be chosen as the stop words. Some of the most common stop words include "the," "is," "at," "which," and "on." Stemming usually refers to a heuristic process that chops off the ends of words aiming to achieve the goal of finding the common root for the words, often including the removal of derivational affixes. Lemmatization usually refers to classifying the words based on the morphological analysis of words, aiming to remove inflectional endings to return the base or dictionary form of a word, which is known as the lemma.

The goal of stemming and lemmatization is to reduce inflectional forms and sometimes derivationally related forms of a word to a common base form. For instance, "am," "are," and "is" may be represented by the word "be." "House," "house's," and "houses" may be represented by simply "house."

As used herein, the similarity coefficient between a first word and a second word is a real number that quantifies a similarity between the first word and the second word. In some example embodiments, the similarity coefficient range is [0-1], but other ranges are also possible. In some embodiments, cosine similarity is utilized to calculate the similarity coefficient between the word vectors.

Below are some of the similarity results for the words "software" and "doctor," where each similar word is followed by the similarity coefficient with reference to "software" and "doctor," respectively. The top 15 similar words are presented sorted by the similarity coefficient.

Top 15 similar words for "software":
software 1.0000
sofware 0.8110
sotware 0.7480
softwre 0.6879
frontend 0.6857
android 0.6615
softaware 0.6610
python 0.6582
softwar 0.6541
firmware 0.6282
php 0.6214
sofrware 0.6152
sotfware 0.6032
softwere 0.6016
fullstack 0.5967
softeware 0.5960
.net 0.5959
softare 0.5922
application 0.5881
alphappl 0.5841
Top 15 similar words for "doctor":
doctor 1.0000
docter 0.6323
naturapathy 0.5915
fy1 0.5759
docotor 0.5530
fy2 0.5443
philosophiae 0.5412
naturopathic 0.5386
naturopathy 0.5365
introduktionslaege 0.5340
medicicne 0.5327
paediatrics 0.5321
nautropathic 0.5266
doctore 0.5247
paeditrics 0.5234
docotr 0.5226
obstetric&gynaecology 0.5207
gpst2 0.5207
homoeopathic 0.5191
physician 0.5172

It is noted that the list includes misspelled words, such as "sofware" and "docter." However, many titles have more than one word (e.g., "software engineer," "administrative assistant," etc.), and the compressed vectors 908 for the plurality of words of the title have to be combined at operation 910 to obtain combination vectors 912, which are compressed vectors resulting from combining the compressed vectors of two or more words. For example, the combination vector 912 for "software engineer" is obtained by combining the compressed vectors 908 of "software" and "engineer" (represented as W1~W2).

There are several merging techniques for combining vectors, in one example embodiment, the vectors are combined by calculating the average of the vectors, which includes calculating the averages for each of the elements within the vector.

In another example embodiment, the vectors are merged by calculating the sum of the compressed vectors 908. In yet other example embodiments, some of the words are not included for calculating the combination vectors 912 because some of the words may be noise for some of the titles. For example with a title such as "President of the Trade Association of American Plumbers," the words "of," "the," and "American" may be ignored to obtain the title combination vector 912.

In some example embodiments, weights are assigned to each of the word vectors before combining them, based on their expected contribution to the meaning of the title, and the combination vector is calculated by adding the weighted vectors for each of the words. It is noted that one of the weights may be 0, which is equivalent to not using the word vector for the combination vector. In one example embodiment, the weights are calculated utilizing term frequency-inverse document frequency (TF-IDF) scores.

TF-IDF is a numerical statistic intended to reflect how important a word is to a document in a collection or corpus. The TF-IDF increases in value proportionally to the number of times a word appears in the document, but is offset by the frequency of the word in the corpus, which helps to adjust for the fact that some words appear more frequently in general.

TF is the raw frequency of a term in a document (i.e., the number of times that a term occurs in a document). The IDF is a measure of how much information the word provides (that is, whether the term is common or rare across all documents). In some example embodiments, the IDF is calculated as the logarithm of the total number of documents divided by the number of documents containing the term. In other example embodiments, other equations may be utilized to calculate the IDF. The TF-IDF is then calculated as the TF times the IDF, but other combinations of TF and IDF may be used to calculate the TF-IDF.

"Software" is an important title word that obtains a TF of 2 and an IDF of 5, in one example. Thus, the TF-IDF is 10 (2×5). Another word such as "USA" is very common and the resulting TF-IDF is 0, or close to 0.

In some example embodiments, the combination vector 912 is calculated by obtaining the weighted average of the compressed vectors 908, where the weights are the respective TF-IDFs of the words. This may be expressed according to the following equation:

$$\overline{CV} = (\Sigma w_i)^{-1} \cdot \Sigma w_i \overline{WV_i} \quad (1)$$

Where $\overline{CV}$ is the combination vector 912, $w_i$ is the weight (e.g., TF-IDF) for word i, and $\overline{WV_i}$ is the compressed vector for word i. In another example embodiment, the combination vector 912 may be calculated simply as:

$$\overline{CV} = \Sigma w_i \overline{WV_i} \quad (2)$$

In another example embodiment, the top n (e.g., 3) most important words (measured by their TF-IDF) are used to calculate the combination vector 912. However, some important context maybe lost with this approach as some of the discarded words may have an important semantic meaning.

Once the compressed vectors are available for single and multi-word titles, a title similarity analysis 914 is performed to obtain the similarity values 916. In one example embodiment, the following top-ten results were obtained for the title "business analyst," including the similarity coefficient:

0.9406, "senior business analyst";
0.8023, "senior analyst";
0.7802, "business consultant";
0.7775, "financial analyst";
0.7640, "research analyst";
0.7423, "business development";
0.7332, "business development manager";
0.7010, "business development executive";
0.6894, "director business development"; and
0.5868, "senior account manager."

In another example embodiment, the cosine similarity between "software engineer" and "application developer" was calculated with a similarity coefficient of 0.6377.

Figure 10:
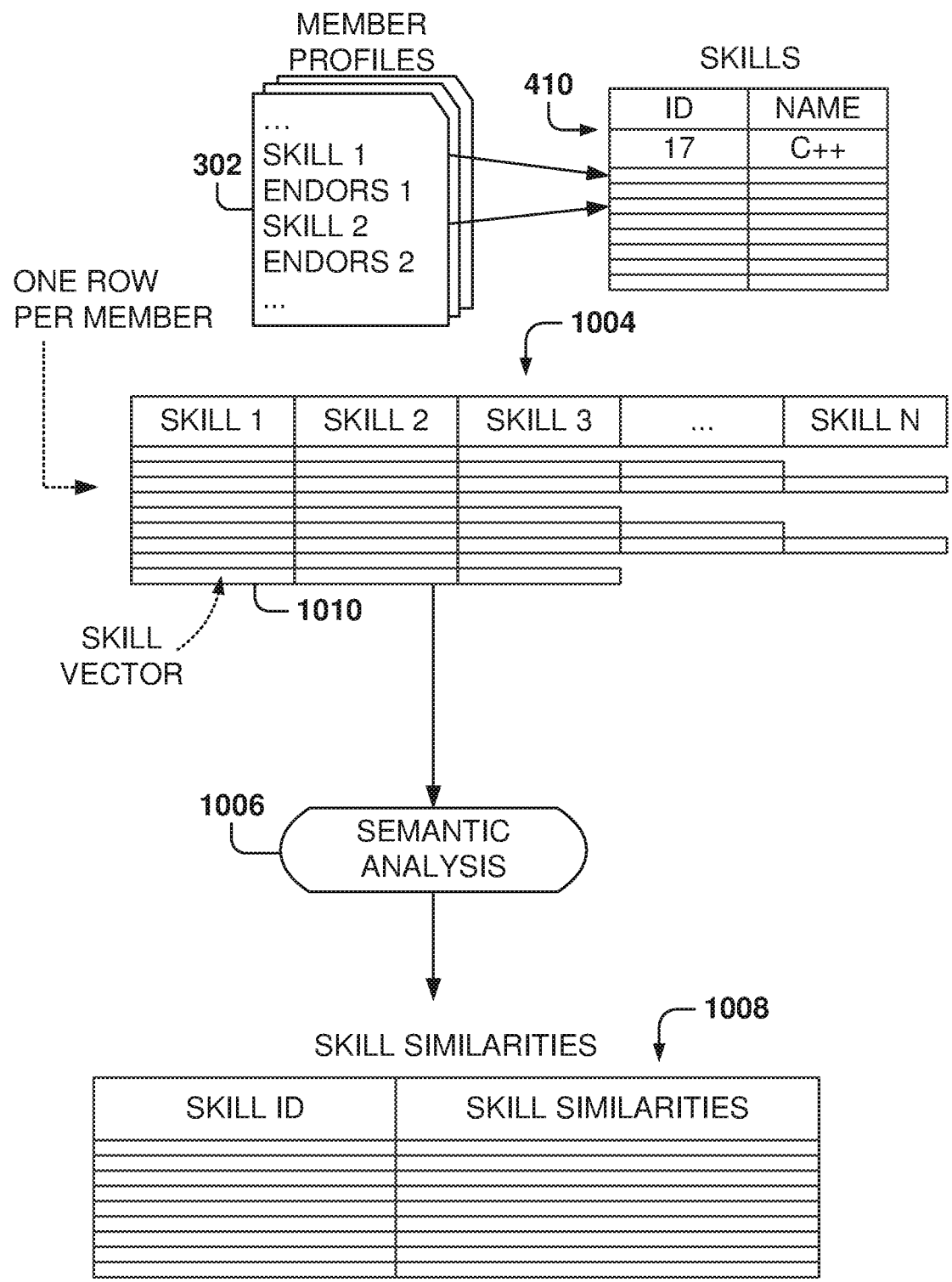
FIG. 10 illustrates a method for identifying similarities among member skills, according to some example embodiments.

FIG. 10 illustrates a method for identifying similarities among member skills, according to some example embodiments. In some example embodiments, the skills similarities are identified in order to improve job searching.

Skills may also be extracted from job posts. For example, by analyzing the job title, description, or requirements, one or more skills may be identified for the job. The goal is to recommend jobs to members who have skills relevant to the job, including skills that are similar to the ones found from the job posting. If only the literal meaning is considered for the job skills, then important opportunities may be lost. For example, if the job search system is not aware of the similarity between "machine learning" and "data mining" skills, then a person may miss good jobs that are good matches for the member.

In some example embodiments, the skill data 410 includes a skill identifier (e.g., an integer value) and a skill description text (e.g., C++). The member profiles 302 are linked to the skill identifier, in some example embodiments.

Initially, a compressed skill vector 1010 is created for each skill (for example, by following the same process described with reference to FIG. 9 for titles). Afterwards, a concatenated skill table 1004 is created, where each row includes a sequence with all the skills for a corresponding member. Thus, the first row of concatenated skill table 1004 includes all the compressed skill vectors for the skills of the first member, the second row includes all the compressed skill vectors for the skills of the second member, and so forth.

Semantic analysis 1006 is then performed on the concatenated skill table 1004. In one example embodiment, Word2vec is utilized with the following parameters: (min_count, 1), (window_size, 25, which was the 90th percentile size), (negative_sample, 25), (concurrent_steps, 12), (subsample, 0), (num_epochs, 15), and (embedding_size, 100). The result is skill similarities 1008, where each skill is associated with corresponding similar skills).

In general, not all skills are of the same importance for a member. Therefore, in some example embodiments, the skills are weighted by multiplying each compressed skill vector 1010 by a corresponding weight. In one example embodiment, the weight is the number of endorsements received by the member for that skill. In general, the more endorsements a member has for a skill, the more important the skill is for the member.

Some example results for "machine learning" (with the skill identifier in parenthesis) include the following:

pattern recognition (5449), 0.9100;
neural network (4892), 0.9053;
artificial intelligence (2407), 0.8989;
natural language processing (5835), 0.8836;
algorithm (1070), 0.8834;
algorithm design (6001), 0.8791;
computer vision (4262), 0.8779;
latex (6420), 0.8500;
computer science (1541), 0.8441;
deep learning (50518), 0.8411;
data mining (2682), 0.8356;
texting mining (7198), 0.8326;
parallel computing (5626), 0.8308;
recommender system (12226), 0.8306;
artificial neural network (12469), 0.8252;
data science (50061), 0.8213;
genetic algorithm (7630), 0.8093;
python (1346), 0.8037; and
image processing (2741), 0.8019.

In other example embodiments, the same similarity analysis may be performed for company names, such that if a member requests a PYMK search and the member has worked for one or more companies, the PYMK search may consider similar companies for possible candidates.

Figure 11:
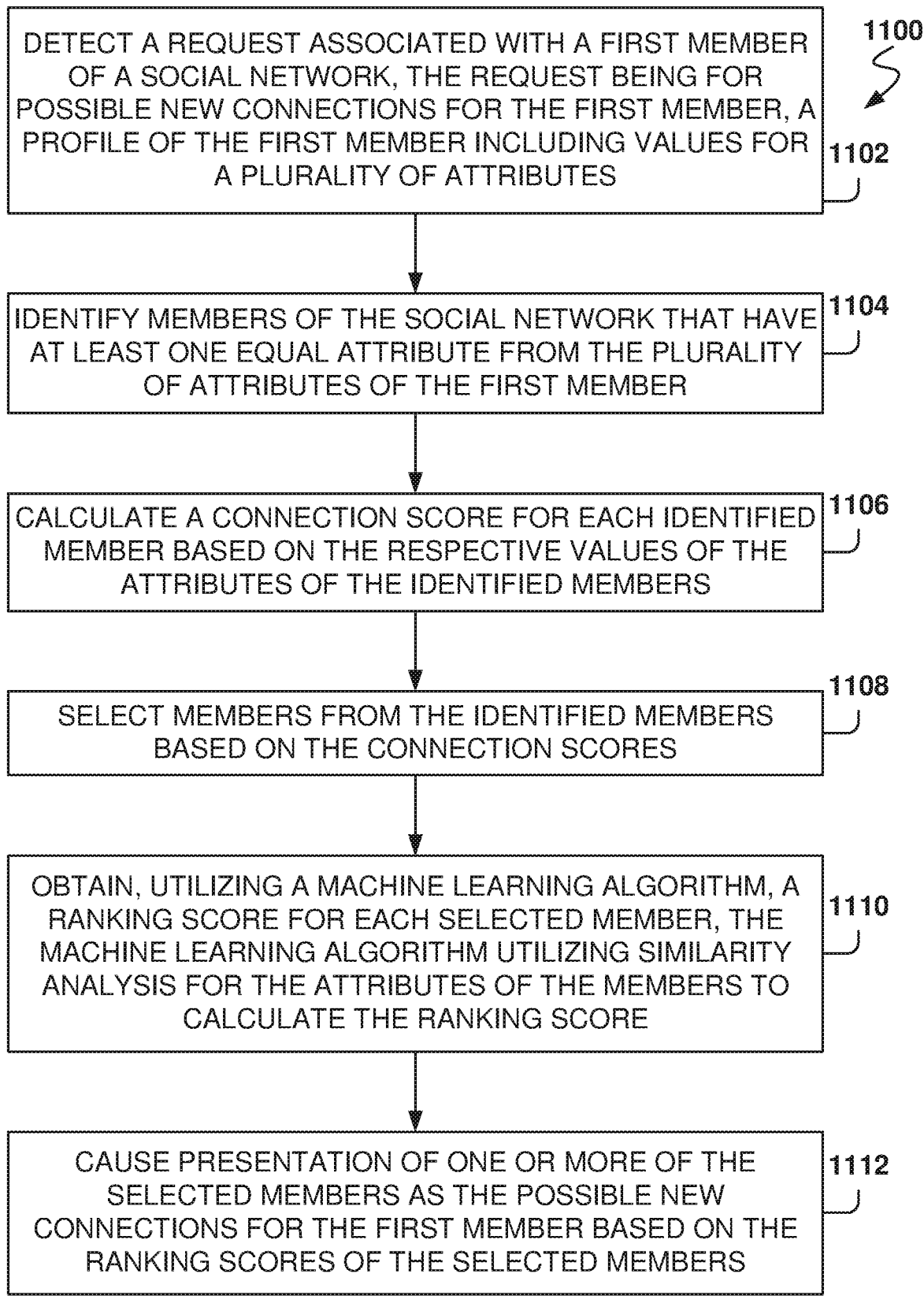
FIG. 11 is a flowchart of a method for recommending new connections based on profile data similarity and existing interconnections within the social network, according to some example embodiments.

FIG. 11 is a flowchart of a method 1100 for recommending new connections based on profile data similarity and existing interconnections within the social network, according to some example embodiments. Operation 1102 is for detecting, by one or more processors, a request associated with a first member of a social network. The request is for possible new connections for the first member, and a profile of the first member includes values for a plurality of attributes.

From operation 1102, the method flows to operation 1104 for identifying, by the one or more processors, members of the social network that have at least one equal attribute from the plurality of attributes of the first member.

From operation 1104, the method flows to operation 1106 for calculating, by the one or more processors, a connection score for each identified member based on the respective values of the attributes of the identified members At operation 1108, the one or more processors select members from the identified members based on the connection scores. From operation 1108, the method flows to operation 1110 for obtaining, utilizing a machine learning algorithm, a ranking score for each selected member. The machine learning algorithm utilizes similarity analysis for the attributes of the members to calculate the ranking score. Further, at operation 1112, the one or more processors cause presentation of one or more of the selected members as the possible new connections for the first member based on the ranking scores of the selected members.

In one example, the method 1100, where the plurality of attributes includes a connection-of-connection flag indicting if a member of the social network is a connection of a connection of the first member. Further, in one example, the plurality of attributes further includes a title of the member, an industry of the member, companies where the member has worked, and educational institutions attended by the member.

In one example, the method 1100 as recited, where identifying the members of the social network further includes accessing a reverse index for a first attribute from the plurality of attributes, the reverse index identifying members of the social network having a same value of the first attribute as the first member.

In another example, the method 1100 as recited, where the reverse index is calculated offline for the members of the social network.

In yet another example, the method 1100 as recited, where calculating the connection score for each identified member further includes determining one or more attributes with a value equal to the value of the attribute for the first member, and calculating a weighted sum for the determined one or more attributes.

In another example, the method 1100 as recited, where selecting the members from the identified members further includes identifying a top predetermined number of identified members based on the respective connection score.

In some embodiments, the similarity analysis includes identifying similar attribute values that are similar to the values of the attributes of the first member.

In some example embodiments, the machine learning algorithm is trained based on values of attributes of the members of the social network and based and a selection history of members when presented possible new connections.

In another example, the method 1100 as recited, where the machine learning algorithm is trained offline for appraising features associated with the machine learning algorithm for calculating the ranking score.

Figure 12:
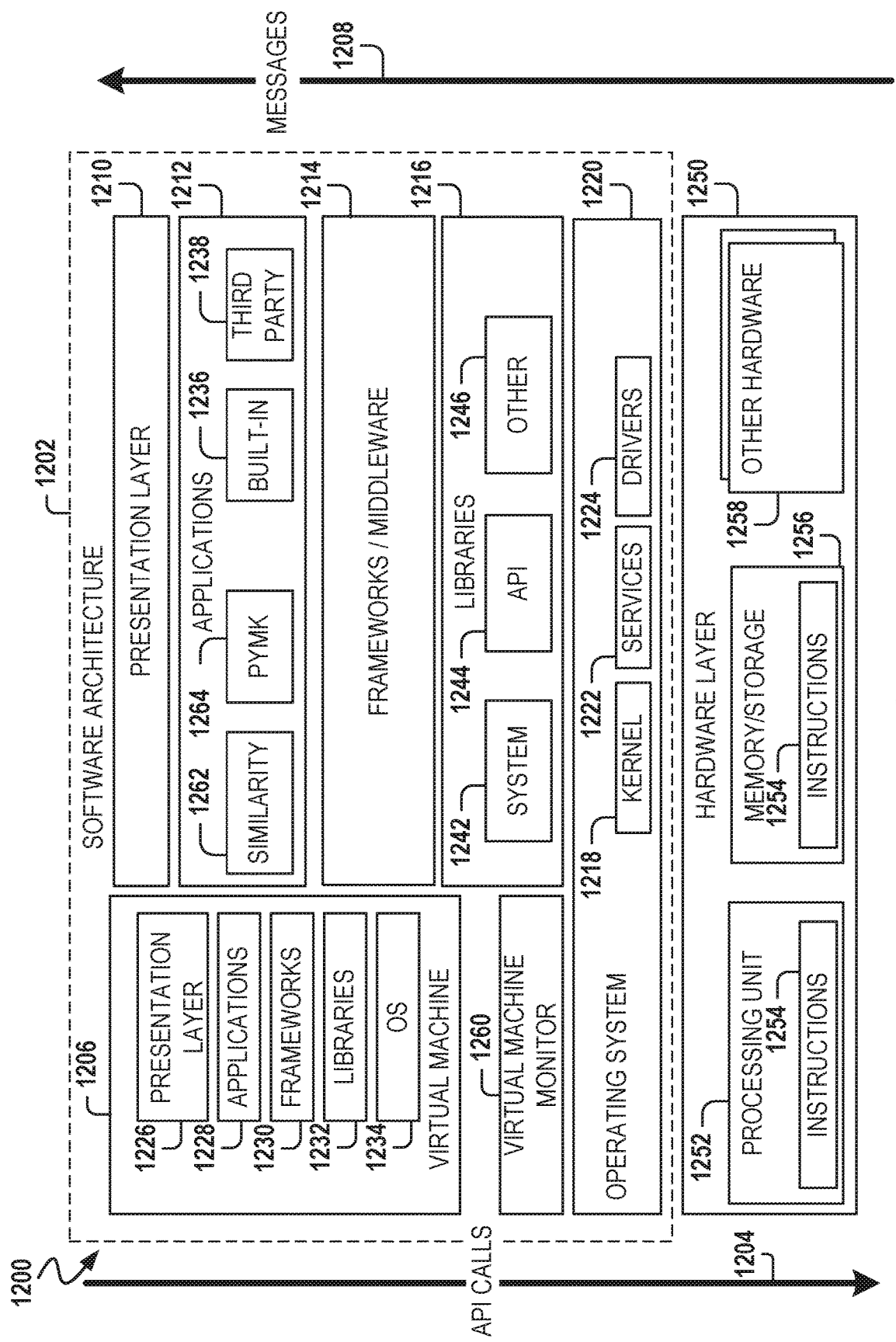
FIG. 12 is a block diagram illustrating an example of a software architecture that may be installed on a machine, according to some example embodiments.

FIG. 12 is a block diagram 1200 illustrating a representative software architecture 1202, which may be used in conjunction with various hardware architectures herein described. FIG. 12 is merely a non-limiting example of a software architecture 1202 and it will be appreciated that many other architectures may be implemented to facilitate the functionality described herein. The software architecture 1202 may be executing on hardware such as a machine 1300 of FIG. 13 that includes, among other things, processors 1304, memory/storage 1306, and input/output (I/O) components 1318. A representative hardware layer 1250 is illustrated and may represent, for example, the machine 1300 of FIG. 13. The representative hardware layer 1250 comprises one or more processing units 1.252 having associated executable instructions 1254. The executable instructions 1254 represent the executable instructions of the software architecture 1202, including implementation of the methods, modules and so forth of FIGS. 1-11. The hardware layer 1250 also includes memory and/or storage modules 1256, which also have the executable instructions 1254. The hardware layer 1250 may also comprise other hardware 1258, which represents any other hardware of the hardware layer 1250, such as the other hardware illustrated as part of the machine 1300.

In the example architecture of FIG. 12, the software architecture 1202 may be conceptualized as a stack of layers where each layer provides particular functionality. For example, the software architecture 1202 may include layers such as an operating system 1220, libraries 1216, frameworks/middleware 1214, applications 1212, and a presentation layer 1210. Operationally, the applications 1212 and/or other components within the layers may invoke API calls 1204 through the software stack and receive a response, returned values, and so forth illustrated as messages 1208 in response to the API calls 1204. The layers illustrated are representative in nature and not all software architectures have all layers. For example, some mobile or special purpose operating systems may not provide a frameworks/middleware layer 1214, while others may provide such a layer. Other software architectures may include additional or different layers.

The operating system 1220 may manage hardware resources and provide common services. The operating system 1220 may include, for example, a kernel 1218, services 1222, and drivers 1224. The kernel 1218 may act as an abstraction layer between the hardware and the other software layers. For example, the kernel 1218 may be responsible for memory management, processor management (e.g., scheduling), component management, networking, security settings, and so on. The services 1222 may provide other common services for the other software layers. The drivers 1224 may be responsible for controlling or interfacing with the underlying hardware. For instance, the drivers 1224 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1216 may provide a common infrastructure that may be utilized by the applications 1212 and/or other components and/or layers. The libraries 1216 typically provide functionality that allows other software modules to perform tasks in an easier fashion than to interface directly with the underlying operating system 1220 functionality (e.g., kernel 1218, services 1222, and/or drivers 1224). The libraries 1216 may include system libraries 1242 (e.g., C standard library) that may provide functions such as memory allocation functions, string manipulation functions, mathematic functions, and the like. In addition, the libraries 1216 may include API libraries 1244 such as media libraries (e.g., libraries to support presentation and manipulation of various media formats such as MPEG4, H.264, MP3, AAC, AMR, JPG, PNG), graphics libraries (e.g., an OpenGL framework that may be used to render two-dimensional and three-dimensional graphic content on a display), database libraries (e.g., SQLite that may provide various relational database functions), web libraries (e.g., WebKit that may provide web browsing functionality), and the like. The libraries 1216 may also include a wide variety of other libraries 1246 to provide many other APIs to the applications 1212 and other software components/modules.

The frameworks 1214 (also sometimes referred to as middleware) may provide a higher-level common infrastructure that may be utilized by the applications 1212 and/or other software components/modules. For example, the frameworks 1214 may provide various graphic user interface (GUI) functions, high-level resource management, high-level location services, and so forth. The frameworks 1214 may provide a broad spectrum of other APIs that may be utilized by the applications 1212 and/or other software components/modules, some of which may be specific to a particular operating system or platform.

The applications 1212 include similarity applications 1262, PYMK search 1264, built-in applications 1236, and third-party applications 1238. The similarity applications 1262 are used to calculate similarity values for title, company, school, and the like. Examples of representative built-in applications 1236 may include, but are not limited to, a contacts application, a browser application, a book reader application, a location application, a media application, a messaging application, and/or a game application. The third-party applications 1238 may include any of the built-in applications 1236 as well as a broad assortment of other applications. In a specific example, the third-party application 1238 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1238 may invoke the API calls 1204 provided by the mobile operating system such as the operating system 1220 to facilitate functionality described herein.

The applications 1212 may utilize built-in operating system functions (e.g., kernel 1218, services 1222, and/or drivers 1224), libraries (e.g., system libraries 1242, API libraries 1244, and other libraries 1246), or frameworks/middleware 1214 to create user interfaces to interact with users of the system. Alternatively, or additionally, in some systems, interactions with a user may occur through a presentation layer, such as the presentation layer 1210. In these systems, the application/module "logic" may be separated from the aspects of the application/module that interact with a user.

Some software architectures utilize virtual machines. In the example of FIG. 12, this is illustrated by a virtual machine 1206. A virtual machine creates a software environment where applications/modules may execute as if they were executing on a hardware machine (such as the machine 1300 of FIG. 13, for example). The virtual machine 1206 is hosted by a host operating system (e.g., operating system 1220 in FIG. 12) and typically, although not always, has a virtual machine monitor 1260, which manages the operation of the virtual machine 1206 as well as the interface with the host operating system (e.g., operating system 1220). A software architecture executes within the virtual machine 1206 such as an operating system 1234, libraries 1232, frameworks/middleware 1230, applications 1228, and/or a presentation layer 1226. These layers of software architecture executing within the virtual machine 1206 may be the same as corresponding layers previously described or may be different.

Figure 13:
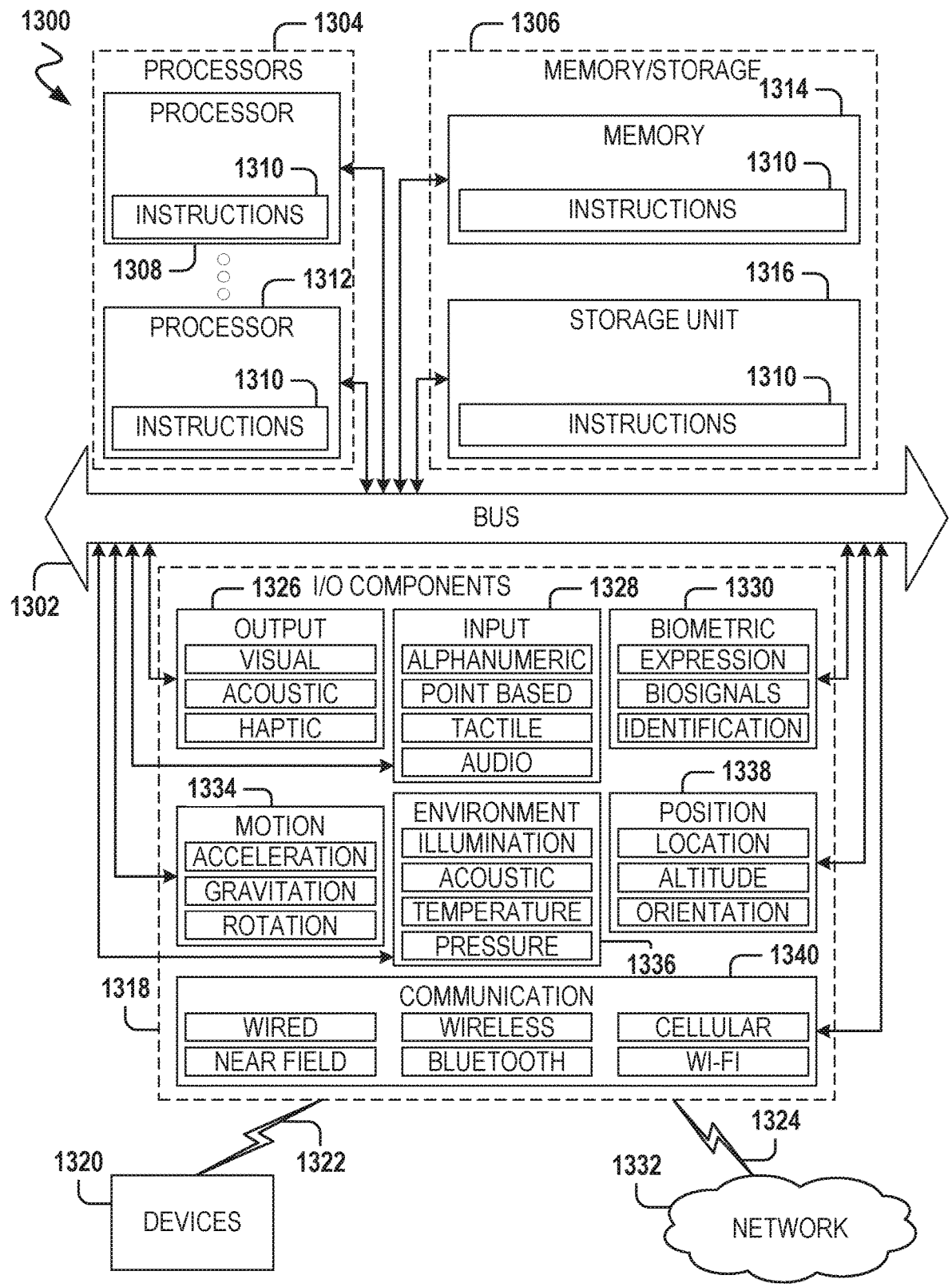
FIG. 13 illustrates a diagrammatic representation of a machine in the form of a computer system within which a set of instructions may be executed for causing the machine to perform any one or more of the methodologies discussed herein, according to an example embodiment.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. For example, the instructions 1310 may cause the machine 1300 to execute the flow diagrams of FIGS. 2, 4, 6, and 9-11. The instructions 1310 transform the general, non-programmed machine 1300 into a particular machine 1300 programmed to carry out the described and illustrated functions in the manner described.

In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a switch, a controller, a server computer, a client computer, a personal computer (PC), a tablet computer, a laptop computer, a netbook, a set-top box (SIB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1310, sequentially or otherwise, that specify actions to be taken by the machine 1300. Further, while only a single machine 1300 is illustrated, the term "machine" shall also be taken to include a collection of machines 1300 that individually or jointly execute the instructions 1310 to perform any one or more of the methodologies discussed herein.

The machine 1300 may include processors 1304, memory/storage 1306, and I/O components 1318, which may be configured to communicate with each other such as via a bus 1302. In an example embodiment, the processors 1304 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific integrated Circuit (ASIC), a Radio-Frequency Integrated Circuit (RFIC), another processor, or any suitable combination thereof) may include, for example, a processor 1308 and a processor 1312 that may execute the instructions 1310. The term "processor" is intended to include multi-core processors that may comprise two or more independent processors (sometimes referred to as "cores") that may execute instructions contemporaneously. Although FIG. 13 shows multiple processors 1304, the machine 1300 may include a single processor with a single core, a single processor with multiple cores (e.g., a multi-core processor), multiple processors with a single core, multiple processors with multiples cores, or any combination thereof.

The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304 (e.g., within the processor's cache memory), or any suitable combination thereof, during execution thereof by the machine 1300. Accordingly, the memory 1314, the storage unit 1316, and the memory of the processors 1304 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1310. The term "machine-readable medium" shall also be taken to include any medium, or combination of multiple media, that is capable of storing instructions (e.g., instructions 1310) for execution by a machine (e.g., machine 1300), such that the instructions, when executed by one or more processors of the machine processors 1304), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1318 may include a wide variety of components to receive input, provide output, produce output, transmit information, exchange information, capture measurements, and so on. The specific I/O components 1318 that are included in a particular machine will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion, and the grouping is in no way limiting. In various example embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1318 may include biometric components 1330, motion components 1334, environmental components 1336, or position components 1338 among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1334 may include acceleration sensor components (e.g., accelerometer), gravitation sensor components, rotation sensor components (e.g., gyroscope), and so forth. The environmental components 1336 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1338 may include location sensor components a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via a coupling 1324 and a coupling 1322, respectively. For example, the communication components 1340 may include a network interface component or other suitable device to interface with the network 1332. In further examples, the communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geo-location, location via Wi-Fi® signal triangulation, location via detecting an NFC beacon signal that may indicate a particular location, and so forth.

In various example embodiments, one or more portions of the network 1332 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1332 or a portion of the network 1332 may include a wireless or cellular network and the coupling 1324 may be a Code Division Multiple Access (CDMA) connection, a Global System for Mobile communications (GSM) connection, or another type of cellular or wireless coupling. In this example, the coupling 1324 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1310 may be transmitted or received over the network 1332 using a transmission medium via a network interface device (e.g., a network interface component included in the communication components 1340) and utilizing any one of a number of well-known transfer protocols (e.g., HTTP). Similarly, the instructions 1310 may be transmitted or received using a transmission medium via the coupling 1322 (e.g., a peer-to-peer coupling) to the devices 1320. The term "transmission medium" shall be taken to include any intangible medium that is capable of storing, encoding, or carrying the instructions 1310 for execution by the machine 1300, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method for recommending members as potential member connections to a first member of an online social networking service, the method comprising:
    detecting, by one or more processors, a request associated with a first member of the social networking service, the request being for potential new member connections for the first member, a profile of the first member including values for a plurality of attributes;
    as part of a candidate retrieval phase for identifying potential candidate member connections to recommend to the first member:
        identifying, by the one or more processors, members of the social networking service who have at least one equal attribute from the plurality of attributes of the first member;
        calculating, by the one or more processors, a connection score for each identified member based on the respective values of the attributes of the identified members;
        selecting, by the one or more processors, a subset of members from the identified members based on the connection scores;
    as part of a ranking phase for ranking candidate member connections to recommend to the first member, obtaining, utilizing a machine learning algorithm, a ranking score for each member in the subset of members, the machine learning algorithm utilizing similarity analysis for the attributes of the members to calculate the ranking score; and
    causing presentation, by the one or more processors, of one or more of the members of the subset of members as the potential member connections for the first member based on the ranking scores of the selected members.

2. The method as recited in claim 1, wherein the plurality of attributes comprises a connection-of-connection flag indicating if a member of the social network is a connection of a connection of the first member.

3. The method as recited in claim 2, wherein the plurality of attributes further comprises a title of the member, an industry of the member, companies where the member has worked, and educational institutions attended by the member.

4. The method as recited in claim 1, wherein identifying the members of the social networking service further comprises:
    accessing a reverse index for a first attribute from the plurality of attributes, the reverse index identifying members of the social network having a same value of the first attribute as the first member.

5. The method as recited in claim 4, wherein the reverse index is calculated offline for the members of the social networking service.

6. The method as recited in claim 1, wherein calculating the connection score for each identified member further comprises:
    determining one or more attributes with a value equal to the value of the attribute for the first member; and
    calculating a weighted sum for the determined one or more attributes.

7. The method as recited in claim 1, wherein selecting the members from the identified members further comprises:
    identifying a top predetermined number of identified members based on the respective connection score.

8. The method as recited in claim 1, wherein the similarity analysis includes identifying attribute values that are similar to the values of the attributes of the first member.

9. The method as recited in claim 1, wherein the machine learning algorithm is trained based on values of attributes of the members of the social networking service and based on a selection history of members when presented possible new connections.

10. The method as recited in claim 1, wherein the machine learning algorithm is trained offline for appraising features associated with the machine learning algorithm for calculating the ranking score.

11. A system comprising:
    a memory comprising instructions; and one or more computer processors, wherein the instructions, when executed by the one or more computer processors, cause the one or more computer processors to perform operations comprising:

detecting a request associated with a first member of a social networking service, the request being for possible new connections for the first member, a profile of the first member including values for a plurality of attributes;

identifying members of the social networking service that have at least one equal attribute from the plurality of attributes of the first member;

calculating a connection score for each identified member based on the respective values of the attributes of the identified members;

selecting a subset of members from the identified members based on the connection scores;

obtaining, utilizing a machine learning algorithm, a ranking score for each selected member, the machine learning algorithm utilizing similarity analysis for the attributes of the members to calculate the ranking score; and causing presentation of one or more of the selected members as the possible new connections for the first member based on the ranking scores of the selected members.

12. The system as recited in claim 11, wherein the plurality of attributes comprises a connection-of-connection flag indicating if a member of the social networking service is a connection of a connection of the first member, a title of the member, an industry of the member, companies where the member has worked, and educational institutions attended by the member.

13. The system as recited in claim 11, wherein identifying the members of the social networking service further comprises:

accessing a reverse index for a first attribute from the plurality of attributes, the reverse index identifying members of the social networking service having a same value of the first attribute as the first member.

14. The system as recited in claim 11, wherein calculating the connection score for each identified member further comprises:

determining one or more attributes with a value equal to the value of the attribute for the first member; and calculating a weighted sum for the determined one or more attributes.

15. The system as recited in claim 11, wherein the similarity analysis includes identifying attribute values that are similar to the values of the attributes of the first member.

16. A non-transitory machine-readable storage medium including instructions that, when executed by a machine, cause the machine to perform operations comprising:

detecting a request associated with a first member of a social networking service, the request being for possible new connections for the first member, a profile of the first member including values for a plurality of attributes;

identifying members of the social networking service that have at least one equal attribute from the plurality of attributes of the first member;

calculating a connection score for each identified member based on the respective values of the attributes of the identified members;

selecting members from the identified members based on the connection scores;

obtaining, utilizing a machine learning algorithm, a ranking score for each selected member, the machine learning algorithm utilizing similarity analysis for the attributes of the members to calculate the ranking score; and causing presentation of one or more of the selected members as the possible new connections for the first member based on the ranking scores of the selected members.

17. The machine-readable storage medium as recited in claim 16, wherein the plurality of attributes comprises a connection-of-connection flag indicating if a member of the social networking service is a connection of a connection of the first member, a title of the member, an industry of the member, companies where the member has worked, and educational institutions attended by the member.

18. The machine-readable storage medium as recited in claim 16, wherein identifying the members of the social networking service further comprises:

accessing a reverse index for a first attribute from the plurality of attributes, the reverse index identifying members of the social networking service having a same value of the first attribute as the first member.

19. The machine-readable storage medium as recited in claim 16, wherein calculating the connection score for each identified member further comprises:

determining one or more attributes with a value equal to the value of the attribute for the first member; and calculating a weighted sum for the determined one or more attributes.

20. The machine-readable storage medium as recited in claim 16, wherein the similarity analysis includes identifying attribute values that are similar to the values of the attributes of the first member.

* * * * *

UNITED STATES PATENT AND TRADEMARK OFFICE
CERTIFICATE OF CORRECTION

| | | |
|---|---|---|
| PATENT NO. | : 10,521,482 B2 | Page 1 of 1 |
| APPLICATION NO. | : 15/543361 | |
| DATED | : December 31, 2019 | |
| INVENTOR(S) | : Zhang et al. | |

It is certified that error appears in the above-identified patent and that said Letters Patent is hereby corrected as shown below:

On the Title Page

On page 2, in Column 2, under "Other Publications", Line 17, delete "Applicational" and insert --Application-- therefor Signed and Sealed this
Twelfth Day of May, 2020

Andrei Iancu
*Director of the United States Patent and Trademark Office*